(12) United States Patent
Brisebois et al.

(10) Patent No.: US 10,979,986 B1
(45) Date of Patent: Apr. 13, 2021

(54) FACILITATING ADAPTIVE POWER SPECTRAL DENSITY WITH CHROMATIC SPECTRUM OPTIMIZATION IN FIFTH GENERATION (5G) OR OTHER ADVANCED NETWORKS

(71) Applicant: AT&T Intellectual Property I, L.P., Atlanta, GA (US)

(72) Inventors: Art Brisebois, Cumming, GA (US); Slawomir Stawiarski, Carpentersville, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/684,887

(22) Filed: Nov. 15, 2019

(51) Int. Cl.
*H04B 7/0426* (2017.01)
*H04W 52/38* (2009.01)
*H04L 12/26* (2006.01)
*H04W 4/08* (2009.01)

(52) U.S. Cl.
CPC ......... *H04W 52/38* (2013.01); *H04L 43/0876* (2013.01); *H04W 4/08* (2013.01)

(58) Field of Classification Search
CPC ............ H04W 52/367; H04W 52/241; H04W 52/243; H04J 14/0213
See application file for complete search history.

(56) References Cited

U.S. PATENT DOCUMENTS

2019/0036578 A1* 1/2019 Zirwas ................ H04B 7/0465

* cited by examiner

*Primary Examiner* — Tu X Nguyen
(74) *Attorney, Agent, or Firm* — Amin, Turocy & Watson, LLP

(57) ABSTRACT

Facilitating adaptive power spectral density with chromatic spectrum optimization in advanced networks (e.g., 5G, 6G, and beyond) is provided herein. Operations of a method can comprise evaluating, by a system comprising a processor, a capture rate of mobile devices within a radio access network. The capture rate is representative of a quantity of mobile devices using a millimeter wave spectrum of the radio access network. The method also can comprise facilitating, by the system, an adjustment to a power spectral density of the radio access network based on a determination that the capture rate fails to satisfy a target capture rate of mobile devices using the millimeter wave spectrum.

20 Claims, 23 Drawing Sheets

FACILITATING ADAPTIVE POWER SPECTRAL DENSITY WITH CHROMATIC SPECTRUM OPTIMIZATION IN FIFTH GENERATION (5G) OR OTHER ADVANCED NETWORKS

TECHNICAL FIELD

This disclosure relates generally to the field of mobile communications and, more specifically, to facilitating adaptive power spectral density in Fifth Generation (5G) or other advanced networks.

BACKGROUND

To meet the huge demand for data centric applications, Third Generation Partnership Project (3GPP) systems and systems that employ one or more aspects of the specifications of the Fourth Generation (4G) standard for wireless communications will be extended to a 5G and/or Sixth Generation (6G) for wireless communications. Unique challenges exist to provide levels of service associated with forthcoming 5G, 6G, and/or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
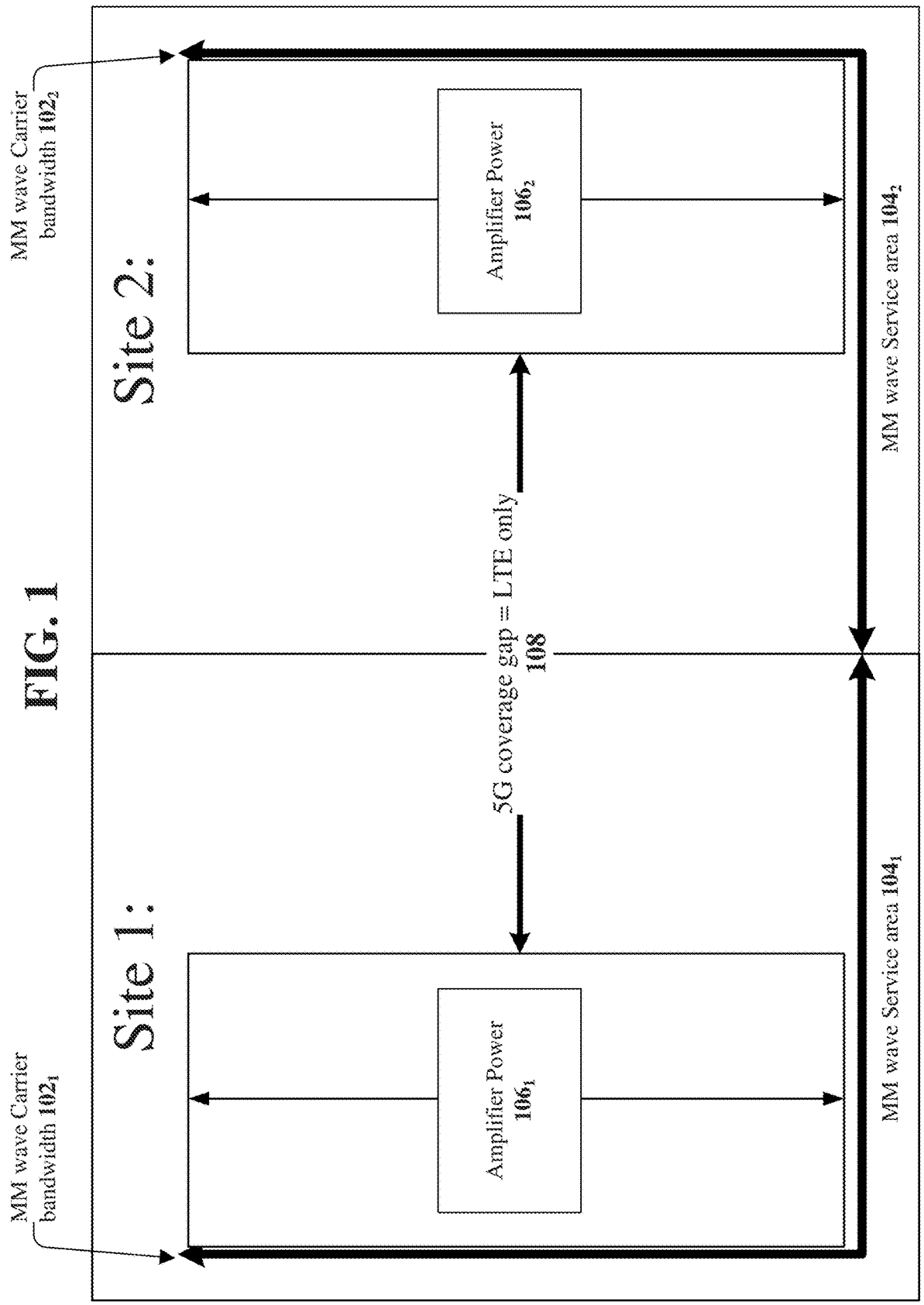
FIG. 1 illustrates an example, non-limiting, representation of a baseline scenario with all millimeter wave spectrum applied to each 5G carrier.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate adaptive power spectral density with chromatic spectrum optimization in advanced networks. Wireless devices, applications, and expectations continue to grow at an exponential rate. This drives an equivalent demand for wireless network bandwidth growth. Wireless network operators acquire and deploy hundreds of Megahertz of radio spectrum and advanced wireless technologies to keep up with the growing demand.

Having exhausted many uses of traditional 4G LTE cellular spectrum in sub-6 GHz bands, many wireless operators have plans to acquire and deploy 5G NR (New Radio) in millimeter wave (MM wave) bands near and above 30 GHz. These MM wave bands have a number of advantages including hundreds of megahertz of available contiguous spectrum (versus less than 20 MHz typical in other bands) and short wavelengths enabling a large number of antennas and associated advanced transmission/reception capabilities (including massive Multiple Input, Multiple Output (MIMO) and beamforming) in a relatively small cell site and device space. Unfortunately, these benefits come at a coverage cost due to the free space transmission loss, absorption, scatter, diffraction, and building material loss characteristics at these high frequencies. It is quite difficult to build and deploy MM wave networks and devices that cover, enhance capacity and performance over large areas as lower frequency bands do.

Conventional coverage enhancement techniques have their limitations. For example, higher transmitter power can be used to overcome higher transmission path loss. High transmission power might not be allowed, practical, or safe at space, thermal, and power limited cell sites and devices. Narrow beam-forming antennas can also be used to concentrate energy and yield higher antenna gain. Complex beam-forming antenna arrays, with enough gain to overcome MM wave transmission losses, are relatively impractical from a complexity, cost, space, processing and power efficiency perspective. Additional MM wave cell sites can be deployed in densely packed clusters with overlapping coverage. Unfortunately, economics (to fund any MM cell sites desired) and a lack of unlimited eminent domain (to place MM wave cell sites wherever desired) make dense MM wave deployment impractical.

The disclosed aspects provide an automated and dynamic means to balance bandwidth, coverage, and interference via intelligent power spectral density, duplex configuration, and carrier allocation algorithms. It is noted that 5G Millimeter Wave examples are used in this description, however, the disclosed aspects can be used for a variety of other technologies including LTE (small and large cells), WiFi, and so on.

According to an embodiment, provided is a system that can comprise a processor and a memory that stores executable instructions that, when executed by the processor, facilitate performance of operations. The operations can comprise determining that a first utilization level of network devices of a radio access network is below a defined utilization threshold. The first utilization level can be a first number of user equipment devices using a millimeter wave spectrum of the radio access network. The operations also can comprise performing an adjustment of a power spectral density of the network devices of the radio access network by a defined amount based on a second utilization level determined for the network devices of the radio access network. The second utilization level can comprise a second number of user equipment devices using the millimeter wave spectrum of the radio access network. The second number of user equipment devices is greater than the first number of user equipment devices. In an implementation, the network devices of the radio access network can be configured to operate according to a fifth generation wireless network communication protocol.

According to some implementations, the operations can comprise determining a realized utilization level after performing the adjustment of the power spectral density. The realized utilization level can comprise an actual number of user equipment devices using the millimeter wave spectrum of the radio access network after performing the adjustment of the power spectral density.

Further to the implementations in the above paragraph, the operations can comprise comparing the realized utilization level with the second utilization level. Further, the operations can comprise performing a second adjustment to the power spectral density by a second defined value based on a determination that the realized utilization level is less than the second utilization level and is greater than the first utilization level. Further to these implementations, performing the second adjustment to the power spectral density can comprise waiting a defined time interval prior to performing the second adjustment and performing an incremental change to the power spectral density.

With reference to the implementations of the above two paragraphs, additionally or alternatively, the operations can comprise reversing the adjustment to the power spectral density based on determination that the realized utilization level is less than the first utilization level.

The operations can comprise, according to some implementations, prior to performing the adjustment of the power spectral density, comparing a quantity of user equipment devices not using the millimeter wave spectrum with the first utilization level. Further to these implementations, the operations can comprise providing, to a group of user equipment devices of the quantity of user equipment devices not using the millimeter wave spectrum, an opportunity to use the millimeter wave spectrum based on the adjustment of the power spectral density of the network devices of the radio access network.

In some implementations, the operations can comprise evaluating a result of the adjustment of the power spectral density of the network devices of the radio access network. Further, the operations can comprise retaining the result as historical data for an adjustment decision in a subsequent process cycle.

In another example, the system can be deployed in a non-standalone deployment architecture. In an alternative example, the system can be deployed in a standalone deployment architecture.

In another embodiment, provided is a method that can comprise evaluating, by a system comprising a processor, a capture rate of mobile devices within a radio access network. The capture rate is representative of a quantity of mobile devices using a millimeter wave spectrum of the radio access network. The method also can comprise facilitating, by the system, an adjustment to a power spectral density of the radio access network based on a determination that the capture rate fails to satisfy a target capture rate of mobile devices using the millimeter wave spectrum.

In accordance with some implementations, facilitating the adjustment can comprise facilitating the adjustment by a first amount determined based on a difference between the capture rate and the target capture rate.

In some implementations, the method can comprise evaluating, by the system, a second capture rate of mobile devices within the radio access network. The second capture rate is representative of a second quantity of mobile devices using the millimeter wave spectrum after facilitating the adjustment to the power spectral density of the radio access network.

Further to the implementations in the above paragraph, the method can comprise facilitating, by the system, a second adjustment to the power spectral density based on a determination that the second capture rate is larger than the first capture rate and fails to satisfy the target capture rate.

In accordance with the above two paragraphs, alternatively or additionally, the method can comprise reverting, by the system, the adjustment to the power spectral density to an original power spectral density based on a determination that the second capture rate is less than the first capture rate.

The method can comprise, according to some implementations, evaluating, by the system, a result of the facilitating the adjustment to the power spectral density. The method also can comprise storing, by the system, the result in a data store as historical reference information. The historical reference information can be utilized in a subsequent adjustment to the power spectral density that is subsequent to the adjustment.

Another embodiment can relate to a machine-readable storage medium, comprising executable instructions that, when executed by a processor, facilitate performance of operations. The operations can comprise monitoring an uplink radio link failure rate associated with mobile devices in a radio access network. The mobile devices can be determined to be utilizing a millimeter wave spectrum of the radio access network. The operations also can comprise based on an evaluation of a bandwidth level and a power spectral density level of the radio access network, performing an operation of a group of operations. The group of operations can comprise reducing the power spectral density level of the radio access network based on increasing the bandwidth level of the radio access network. The group of operations also can comprise converting a carrier of the radio access network to a downlink carrier only.

According to some implementations, reducing the power spectral density level and increasing the bandwidth level can be based on a determination that the bandwidth level is at a defined low level and the power spectral density level is at a defined high level.

In some implementations, the operations can comprise returning a center channel for minimal neighbor spectral overlap. Further, the operations can comprise facilitating an update of neighbor lists stored by the mobile devices.

In accordance with some implementations, the operations can comprise evaluating a result of performing the operation of the group of operations. Further, the operations can comprise storing the result in a data store as historical reference information, wherein the historical reference information is utilized in a subsequent operation of the group of operations.

In further detail and with reference to FIG. 1 illustrated is an example, non-limiting, representation of a baseline scenario with all MM wave spectrum applied to each 5G carrier. FIG. 1 is divided equally between two sites, namely, a first site (Site 1) and a second site (Site 2). The vertical axis represents MM wave carrier bandwidth $102_1$ and $102_2$ for Site 1 and Site 2, respectively. Further, the horizontal axis represents MM wave service area $104_1$ and $104_2$, for each Site 1 and Site 2, respectively.

The availability, reliability, and performance of a radio link between transmitter and receiver is dependent upon a number of factors including and especially the "Signal to Noise Ratio" (SNR). In simplified terms, the SNR is a ratio of the level of intended "signal" (sent by the transmitter and detected at the receiver) versus the level of the "noise" (unintended signal from other sources including other devices, other base stations, and thermal noise from the device's own receiver). Radio links must possess a minimum SNR to be considered available and reliable at any location. The "effective service area" of a base station and device pair is therefore directly proportional to the range over which this minimum SNR is achieved.

In FIG. 1, Site 1 has a first MM wave service area $104_1$, represented by the first block, and Site 2 has a second MM wave service area $104_2$, represented by the second block. The amplifier power for each site is spread over a large spectrum area (e.g., the entire MM wave carrier bandwidth $102_1$ and $102_2$ for each site). For example, Site 1 has a first amplifier power $106_1$ represented by the first arrow, which extends the entire width of the entire MM wave carrier bandwidth $102_1$). Further, Site 2 has a second amplifier power $106_2$ represented by the second arrow, which extends the entire width of the entire MM wave carrier bandwidth $102_2$).

Although the amplifier power is spread over a large spectrum area (e.g., the entire MM wave carrier bandwidth $102_1$ and $102_2$ for each site), there is a low coverage area. Accordingly, there is a 5G coverage gap area 108, represented by the arrow between the first MM wave service area $104_1$ and the second MM wave service area $104_2$. Within the 5G coverage gap area 108, there is no 5G coverage. Accordingly, only LTE coverage is available for devices within the 5G coverage gap area 108.

The large bandwidth equates to high peak throughput whether path loss is low (near cell) as represented by the first block (representing the first MM wave service area $104_1$) and the second block (representing the second MM wave service area $104_2$). Further, the large bandwidth equates to low power spectral density, low availability, or no throughput where path loss is high (mid and far-cell), which is within the 5G coverage gap area 108.

Figure 2:
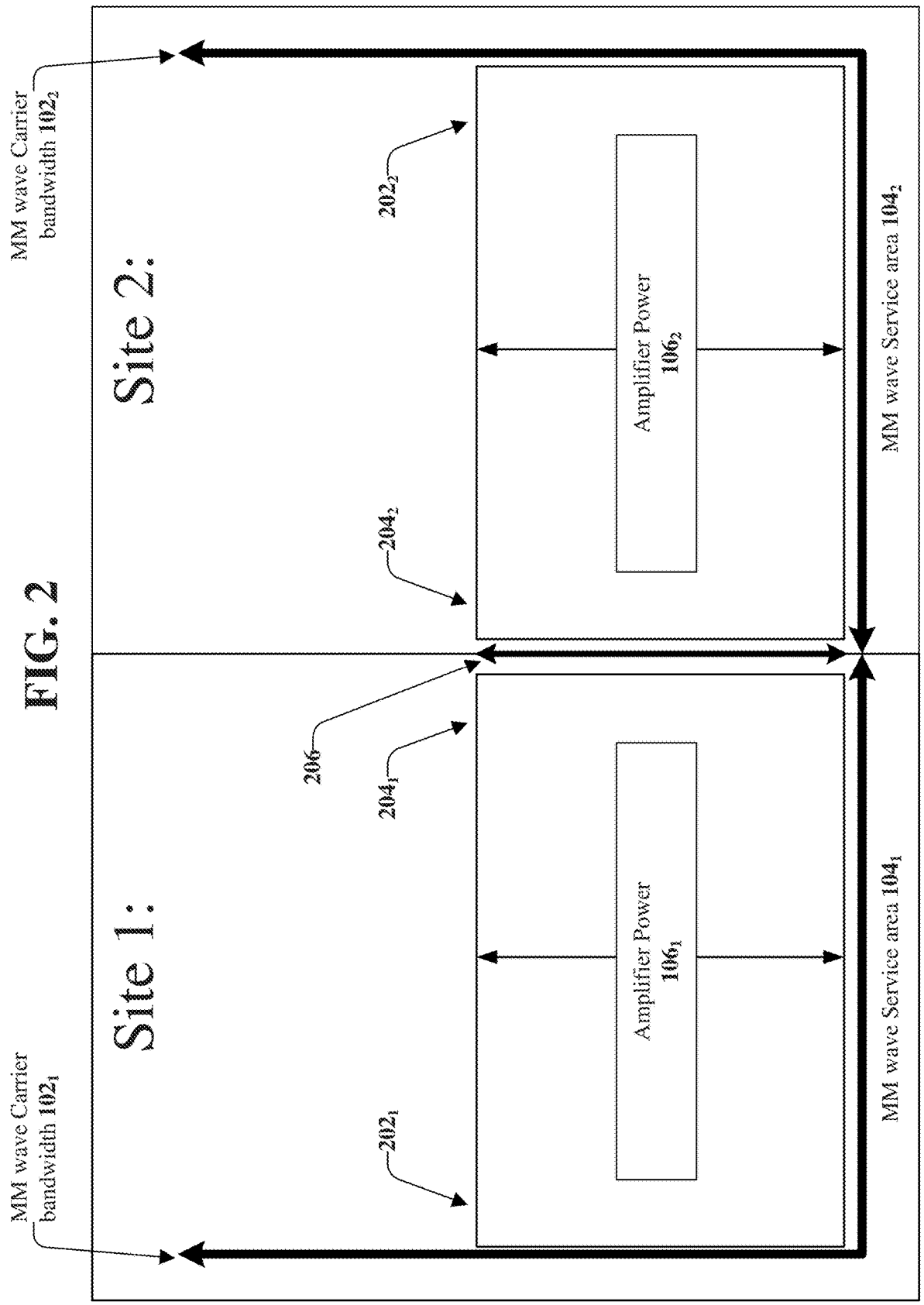
FIG. 2 illustrates an example, non-limiting, representation of a power spectral density optimization in advanced networks in accordance with one or more embodiments described herein.

FIG. 2 illustrates an example, non-limiting, representation of a power spectral density optimization in advanced networks in accordance with one or more embodiments described herein. Repetitive description of like elements employed in other embodiments described herein is omitted for sake of brevity.

Through application of the aspects provided herein, the first amplifier power $106_1$ and the second amplifier power $106_2$ are spread over a smaller spectral area (e.g., the MM wave carrier bandwidth $102_1$ and $102_2$ for each site). However, the amplifier power is spread over a larger service area (e.g., in the example of FIG. 2 this is nearly the entire portions of the first MM wave service area $104_1$ and the second MM wave service area $104_2$, respectively for each site).

The reduced bandwidth equates to lower peak throughput where path loss is low (e.g., near the cell $202_1$, $202_2$). Further, the reduced bandwidth equates to higher power spectral density, improved availability where path loss is high (mid- and far-cell $204_1$, $204_2$). Further, increased coverage and spectral overlap can equal higher interference probability, lower Signal to Interference plus Noise Ratio (SINR), and throughput near the cell edge 206.

There are various factors that can impact a signal ("S"). At any location, the signal level ("S") can be determined by a number of factors including serving transmitter power, antenna gain, path loss, and receiver antenna gain. As mentioned, wireless base station and device transmitter power is typically limited. This is especially true for MM wave and other bands with high path loss. In the wireless device case, transmitter power is limited by space, thermal, battery power, interference, complexity, cost, and radiation exposure (Specific Absorption Rate (SAR) restrictions. In the base station case, transmitter power is limited by space, thermal, interference, complexity, cost, radiation exposure, and link imbalance restrictions. Link imbalance restrictions apply if the radio carrier is bi-directional, which means transmission and reception are required at the wireless base station and device over paired or time-duplexed frequencies. In this bi-directional radio carrier case, minimum SNR must be achieved at both the wireless base station and device receivers in order for the radio link to be considered available and reliable.

Aggregate base station transmitter power is used to generate radio transmissions over a selected range of frequencies (Bandwidth) assigned to a radio carrier. This transmitter power is effectively subdivided (e.g., spread) over all the frequencies between the start and stop frequency. For any slice of spectrum within a radio carrier, the available transmitter power (therefore coverage) is inversely proportional to the total number of spectrum slices (bandwidth) that all share the same aggregate transmitter power of the radio carrier. The effective power per spectrum slice is represented by the "Power Spectral Density" (PSD) term. For the same aggregate transmitter power, a 300 MHz wide radio carrier has half the power spectral density (e.g., about 3 dB less coverage) compared to a 150 MHz wide radio carrier. Likewise, it is possible to "capture" more 5G device traffic on 5G (versus 4G only) by reducing 5G carrier bandwidth and increasing power spectral density. This solution can adjust 5G radio carrier bandwidth to achieve a desired PSD, coverage, and "5G capture rate".

Figure 3:
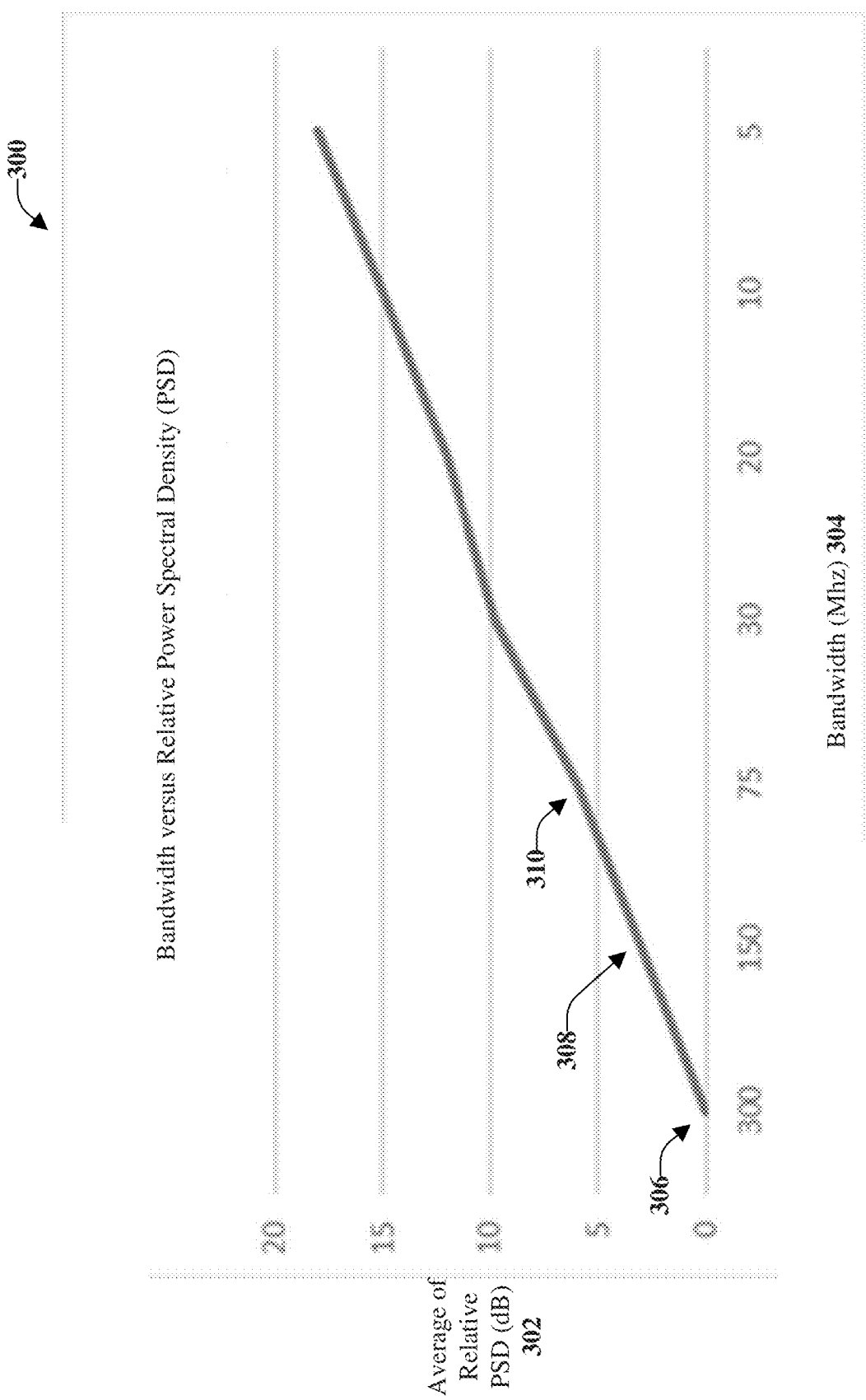
FIG. 3 illustrates an example, non-limiting, chart showing bandwidth versus relative power spectral density.

FIG. 3 illustrates an example, non-limiting, chart 300 showing bandwidth versus relative power spectral density. Represented on the vertical axis is the average relative power spectral density 302, in decibels (dB). Represented on the horizontal axis is bandwidth 304, in megahertz (MHz). As indicated at 304 at around 300 Mhz, the PSD is approximately zero. Further, as indicated at 306, when the bandwidth is reduced by half (e.g., to about 150 MHz), the PSD increases about three dB. By reducing the bandwidth in half again (e.g., to about 75 MHz), the PSD increase by around three dB (e.g. to around 6 dB), as indicated at 310. Further reductions in the bandwidth can have a corresponding increase of the PSD in a similar manner It is noted that, in an example, three decibels could result if the transmitted bandwidth is reduced by half. If the spectrum is reduced by another half or by 75% in total, then the power spectral density can be adjusted by approximately six decibels. However, the disclosed aspects are not limited to these values and other decibel values are also possible with the disclosed aspects.

Additionally, there are various factors that can impact noise ("N"). At any location, the noise ("N") can be determined by a number of factors including interfering transmitter power, antenna gain, path loss (between interferer and victim receiver), and "spectral overlap" between the intended signal and the interfering signal. "Spectral overlap" can be defined as the portion of an intended signal that is impaired by an interfering signal. For example, consider the case for a radio carrier that includes frequencies 1 through 100. If the interfering radio carrier also includes frequencies 1 through 100, the spectral overlap is 100% (all frequencies interfered). An example of this is depicted in FIG. 2.

If the interfering radio carrier includes frequencies 51 through 150, the spectral overlap is 50% (e.g., half of frequencies interfered), noise is reduced by half (e.g., 3 dB or another value) and SNR is doubled. If the interfering radio carrier is shifted to frequencies 101 through 200, the spectral overlap is 0%, these carriers are "orthogonal" and there is no interference between them. This solution can adjust center frequency allocation to achieve a desired spectral overlap that yields minimum interference for maximum throughput.

Figure 4:
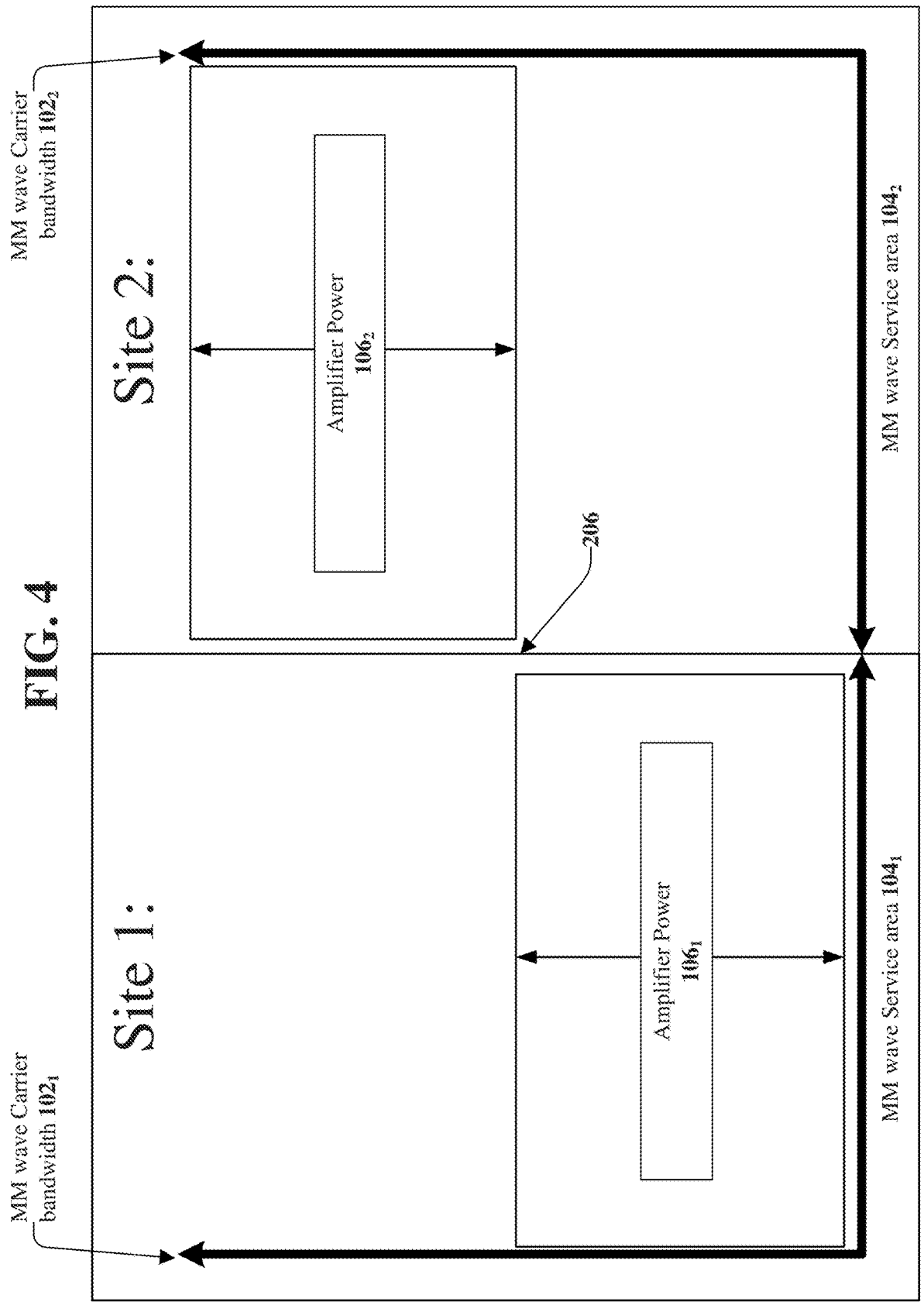
FIG. 4 illustrates an example, non-limiting, representation of a power spectral density optimization in advanced networks in accordance with one or more embodiments described herein.

FIG. 4 illustrates an example, non-limiting, representation of a power spectral density optimization in advanced networks in accordance with one or more embodiments described herein. Repetitive description of like elements employed in other embodiments described herein is omitted for sake of brevity.

As illustrated, the first MM wave service area $104_1$ occupies a first portion of the MM wave carrier bandwidth and the second MM wave service area $104_2$ occupies a second portion of the MM wave carrier bandwidth. Accordingly, there can be reduced spectral overlap, which can provide lower interference probability, higher SINR and throughput near the cell edge 206.

Availability and reliability improvement options have been discussed. Beyond availability and reliability, the aggregate speed and capacity of a radio link can be dependent upon a number of factors including SNR (described above) and radio bandwidth. This is where the intelligent tradeoffs are utilized, as discussed herein. As described above, it is possible to increase "S" by reducing bandwidth to increase power spectral density and coverage. It is also possible to reduce "N" by shifting/offsetting the center frequency of reduced-bandwidth carriers to reduce spectral overlap and interference. Combined, these techniques improve S/N, but at the cost of radio bandwidth. For these reasons, the disclosed aspects can dynamically monitor and fine tune bandwidth, power spectral density, and spectral overlap to yield the best combination of availability, reliability, aggregate speed, and capacity.

The disclosed aspects are composed of four primary components including opportunity detection, solution definition, solution implementation, and results verification. First, opportunity detection will be discussed.

As mentioned above, it is possible to "capture" more 5G device traffic on 5G (versus LTE only) by reducing bandwidth and increasing Power Spectral Density (PSD). In this case, the additional 5G "captured" devices (within range of the expanded 5G coverage area) can benefit from additional 5G bandwidth (versus prior LTE only), but the other 5G users (that were closer to and served by 5G before the PSD change) could have less 5G bandwidth. Before PSD changes are applied, it is therefore important to estimate and consider the net performance gain or loss for all the affected users.

First, it should be identified whether there is a "need" to adjust power spectral density at all. Consider the purpose behind 5G MM wave deployment in the first place. Network operators deploy MM wave 5G where user demand exceeds the capacity and performance that can be delivered by 4G and other frequency bands. The 5G MM wave is, therefore, expected to deliver an overall capacity and performance gain over 4G alone. This expectation is only met where the MM wave spectrum and radio resources are well utilized. A typical urban cell site could have less than 100 MHz of sub6 GHz spectrum for all bands combined, and that spectrum can be 85% utilized, for example, during the busiest intervals. If a 300 Mhz wide 24 GHz 5G MM wave carrier is added, the spectrum capacity of the site could be effectively quadrupled. The true capacity benefit (and return on investment) for this new spectrum and hardware deployment is only realized if the MM wave spectrum and hardware take on a significant portion of the traffic load previously handled by LTE alone. For these reasons, PSD adjustments can be triggered by a relative spectrum utilization statistic. If (for example) 100 MHz of sub6 GHz spectrum is utilized 85% and 300 MHz of MM wave spectrum is utilized 10%, then there is a clear need to increase the relative amount of UE and traffic captured by 5G. In this example, the MM wave carrier bandwidth could be reduced from 300 MHz to 75 MHz to gain 6 dB power spectral density and coverage. This could reduce the 5G bandwidth (and peak throughput) by 75%, but the new users captured by 5G after the 6 dB PSD increase gain approximately 75% spectrum capacity compared to 4G alone. The 5G MM wave spectrum utilization is less than LTE, and MM wave benefits from advanced features (such as massive MIMO) that legacy LTE carriers do not benefit from. With this in mind, 75% spectrum capacity gain will likely yield much more than 75% throughput performance improvement. The 5G PSD adjustment need is, therefore, considered significant when the MM wave carrier spectrum utilization is significantly lower than the underlaid sub6 GHz spectrum utilization.

Next, it should be identified whether there is an "opportunity" to improve 5G capture with power spectral density adjustments. Accordingly, metrics can be utilized to predict 5G capture increase before each PSD adjustment, and this prediction can be used to determine if and by how much PSD should be changed. Millimeter wave band 5G is being deployed in "non stand-alone" configuration as discussed herein (although a stand-alone configuration can be utilized with the disclosed aspects. In this case, 5G devices always use LTE primary cells (p-cells) for control, uplink and some downlink traffic. While served by LTE primary cells, some 5G devices can be within range, and also served by MM wave 5G secondary cells (s-cells). This dual connectivity configuration is enabled by "Eutra NR Dual Connectivity" (ENDC). LTE primary cells are therefore common for 5G devices that are and are not also connected to MM wave 5G. LTE statistics, including UE transmit power, uplink signal strength, timing advance, and other indicators of path loss, can be measured, aggregated over time in a database and compared for 5G UE devices that are and are not ENDC connected to 5G. LTE path loss can be estimated using a combination of UE power (max power—UE reported power headroom), uplink signal strength at the LTE p-cell and timing advance. This path loss, plus known eNB transmit power, can be used to create a rough downlink RSRP (Reference Symbol Received Power) estimate for UE devices that are ENDC connected to 5G, versus UE devices that are served by LTE only. Additional measurement and reporting mechanisms (beyond current 3GPP specifications) can be enabled by sensor applications on the UE. For example, UE applications can measure and report (to an analysis platform) ENDC 5G connected status, LTE and 5G downlink signal strength (RSRP) routinely and/or when transitions, such as ENDC add/drop 5G, occur.

In cases where relative 5G spectrum utilization is below a target threshold (need), all available information sources can be applied to determine one or more items. For example, an item to be determined can be 5G device count (e.g., a determination related to how many 5G devices are connected to the LTE primary cell). Another item that can be determined can be 5G capture rate percentage. For example, this determination can be, for each LTE primary cell, what portion of connected 5G devices are also 5G ENDC connected.

Yet another item that can be determined can be the LTE min for ENDC 5G attached. For example, a determination can be made related to what is the minimum LTE signal strength (estimated RSRP) for 5G UEs that are ENDC 5G attached on this LTE primary cell. Another item that can be determined can be the 5G capture rate gain opportunity. For example, the determination can be what portion of the 5G device count have LTE signal strength within achievable range (3 dB, 6 dB, 9 dB, for example) of the current LTE min for ENDC 5G attached.

Further, another item that can be determined can be a 5G performance gain opportunity, PSD increase. As discussed for the 5G capture rate gain opportunity, there is an opportunity to improve the 5G capture rate with PSD tuning. As discussed, each time the bandwidth is halved (e.g., to yield 3 dB PSD gain or another gain value), it can potentially halve the throughput of one or more UE devices already served by 5G. For bi-directional carriers, it is also possible to extend the downlink coverage range beyond the uplink coverage range, thus yielding inferior uplink or a downlink-only carrier. With this in mind, it is important to estimate the throughput performance gain opportunity for additional "captured" 5G devices versus throughput performance loss for 5G devices that are already ENDC 5G attached. In this case, the most beneficial PSD changes enable capture of a large number of 5G devices, from heavily loaded LTE to lightly loaded 5G, with the smallest 5G bandwidth reduction possible.

Additionally, or alternatively, another item that can be determined is the 5G performance gain opportunity, bandwidth increase. Further, the opposite approach can be determined. In typical new technology deployment scenarios, the new technology is less utilized and less loaded compared to legacy technologies. This is often because it takes years for the quantity of new technology devices to match and exceed the quantity of legacy technology devices. With less relative loading, and advanced capabilities such as massive MIMO, the new technology carrier is likely to yield higher performance (throughput) even if bandwidth is the same as legacy technologies. In this case, the disclosed aspects can begin with the highest PSD (minimum bandwidth, maximum coverage) to achieve the highest 5G capture rate possible, then compare the throughput performance of 5G devices that are and are not ENDC 5G attached. In this case, adequate uplink performance for bi-directional 5G carriers should also be confirmed. If a high PSD carrier has poor uplink performance (high radio link failure or poor uplink throughput) then it might be necessary to lower PSD (expand carrier bandwidth) or convert the 5G carrier to downlink only.

Now, the solution definition will be discussed. Upon or after the opportunity has been quantified the same input data (and more) can be utilized to identify the appropriate solution. This solution should define changes that yield the best 5G capture rate and performance (throughput and capacity) possible for 5G devices served by clusters of cells using the same MM wave spectrum. A complete solution includes PSD adjustment for best site coverage and chromatic spectrum optimization (frequency selection within the band) for best cluster interference and performance. For these reasons the solution definition is composed of individual carrier and cluster adjustments.

For the individual carrier adjustments, power spectral density is adjusted at individual carriers to achieve a specific goal. If PSD is low and the goal is to increase 5G capture rate by 25% (for example), then the carrier bandwidth is reduced by enough to increase PSD and coverage to attract 25% more 5G UE devices to complete 5G ENDC registration. If PSD is high and the goal is to reduce uplink radio link failures, then carrier bandwidth is increased by enough to reduce PSD and downlink coverage to the area serving devices that do not have uplink radio link failures. If PSD is moderate and the goal is to reduce uplink radio link failures, then it might be necessary to change the carrier from bi-directional to downlink only. These carrier bandwidth (therefore PSD) adjustments are defined for each carrier with a 5G spectrum utilization, capture rate or uplink radio link failure trigger For the cluster adjustment, upon or after it has been determined that a reduced bandwidth is needed at a sector carrier, it must next determine which portion of the MM wave spectrum allocation (in this case a portion of 300 Mhz) will best suit the sector carrier and its neighbors from an interference perspective. In the baseline scenario (e.g., of FIG. 1), each sector carrier uses the whole 300 MHz spectrum allocation, but coverage and interference are limited. Devices leave the coverage limited MM wave carriers long before overlapping neighbor coverage and interference is a problem. With PSD optimization as discussed herein, the downlink coverage of the 5G MM wave sector carriers can be extended, perhaps all the way to the LTE cell edge. In this case, MM wave 5G sectors carriers do have overlapping coverage and interference. To mitigate this interference, the disclosed aspects can assign neighboring cluster cells to different portions of the MM wave bandwidth that have the least spectrum overlap possible. In the 5G case, this means neighboring sites will be assigned different EUARFCN (center frequencies) which (when combined with the appropriate bandwidth for target PSD) have start and stop frequencies which overlap the least. Spectrum allocations are finite, so it is never possible to avoid all interference between all sector carriers. For this reason, handover counts (of overlaid P-cells and 5G, if available) can be used to weight the sector carrier pairs which require the most spectral isolation. Accordingly, iterative cluster EUARFCN adjustments can be made as PSD, site density and overlapping coverage (due to site growth) change.

The following discusses the solution implementation. As per the solution definition process, her can be defined a set of bandwidth, center frequency, and bi-directional to downlink-only changes for each MM wave 5G sector carrier and its LTE and 5G cluster neighbors. These changes should be applied in a sequence which yields the least risk and transitional performance impact.

Figure 5:
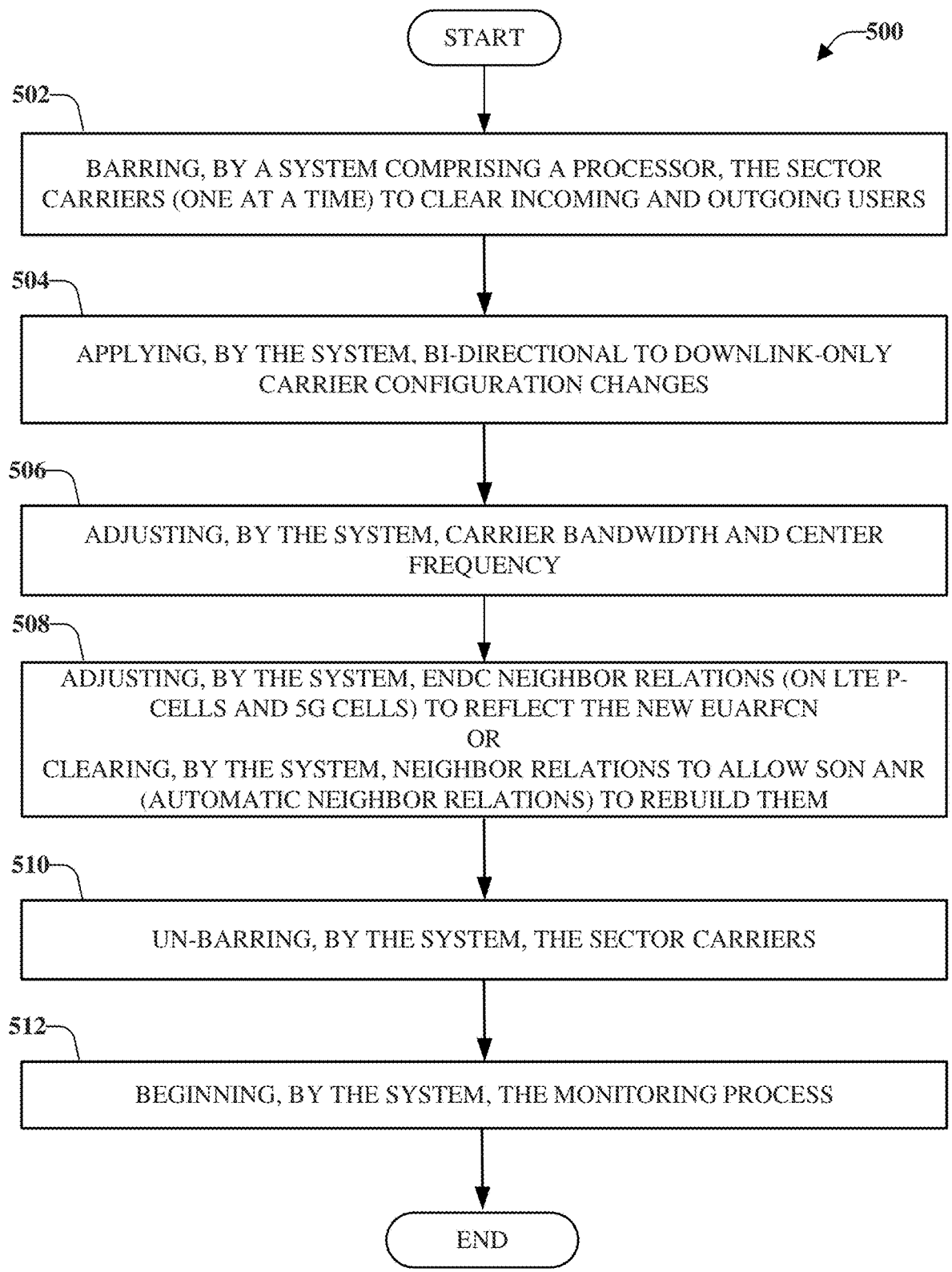
FIG. 5 illustrates a flow diagram of an example, non-limiting, computer-implemented method for facilitating adaptive power spectral density with chromatic spectrum optimization in advanced networks in accordance with one or more embodiments described herein.

FIG. 5 illustrates a flow diagram of an example, non-limiting, computer-implemented method 500 for facilitating adaptive power spectral density with chromatic spectrum optimization in advanced networks in accordance with one or more embodiments described herein. Repetitive description of like elements employed in other embodiments described herein is omitted for sake of brevity.

At 502 of the computer-implemented method 500, as system comprising a processor can bar the sector carriers (one at a time) to clear incoming and outgoing users. Further, at 504 the system can apply bi-directional to downlink-only carrier configuration changes, as required. The carrier bandwidth and center frequency (EUARFCN) can be adjusted at 506 of the computer-implemented method 500.

At 508, all ENDC neighbor relations (on LTE P-cells and 5G cells) can be adjusted to reflect the new EUARFCN or neighbor relations can be cleared to allow SON ANR (Automatic Neighbor Relations) to rebuild them. Then, at 510, the sector carrier can be un-barred by the system. Upon or after the sector carriers are un-barred, at 512, the monitoring process can begin.

For the results verification, as per the solution implementation, a number of parameter changes have been applied to specific MM wave 5G sector carriers, LTE, and 5G cluster neighbors. Next, the disclosed aspects can monitor results to confirm a positive impact for the MM wave 5G sector carrier and 5G devices served in the area.

One or more performance indicators can be trended, according to various implementations. For example, a performance indicator can be a 5G device capture rate (e.g., are more 5G devices (that were previously served by LTE only) using 5G MM wave s-cells?). Another performance indicator can be a 5G utilization (e.g., Are 5G resources (for example PRB (Physical Resource Blocks) used more?).

Yet another performance indicator can be a 5G device throughput distribution. For example, has the 5G device throughput distribution (for aggregate of LTE and 5G use by all 5G capable devices) improved? This performance indicator can comprise an average throughput, a peak throughput; a low throughput percentage (e.g., did the occurrence of throughput <5 Mbps decrease or increase?), or combinations thereof. Additionally or alternatively, Quality of Service (QoS) can be evaluated (e.g., how many of the user devices close to the cell are going to be push down below acceptable limits).

Another performance indicator can be a 5G device retainability. For example, it can be determined whether 5G device reliability has improved. This performance indicator can include one or more of a radio link failure rate (e.g., uplink and/or downlink), a call reestablish rate, and/or a dropped call rate.

Still another performance indicator can be a new effective 5G service area: Has the effective 5G service area expanded? This measurement can be obtained from a number of metrics including, for example, 5G s-cell timing advance distribution and device reporting mechanisms that include 5G calls (with 5G s-cell) tagged with GPS location.

With timing advance, the further the device gets from the cell site, the sooner the device needs to send uplink burst to arrive at the receiver on the cell site (e.g., the network). By looking at timing advance distribution, it can be determined how far away the UE devices are on the 5G cell. If that distribution increases, it can be determined that more UE devices from the cell were captured (e.g., the intended result was achieved). If any one of these checks shows something negative, for example, the drop call rate spikes because it was pushed too far, then remedial action can be taken as will be discussed further below.

Figure 6:
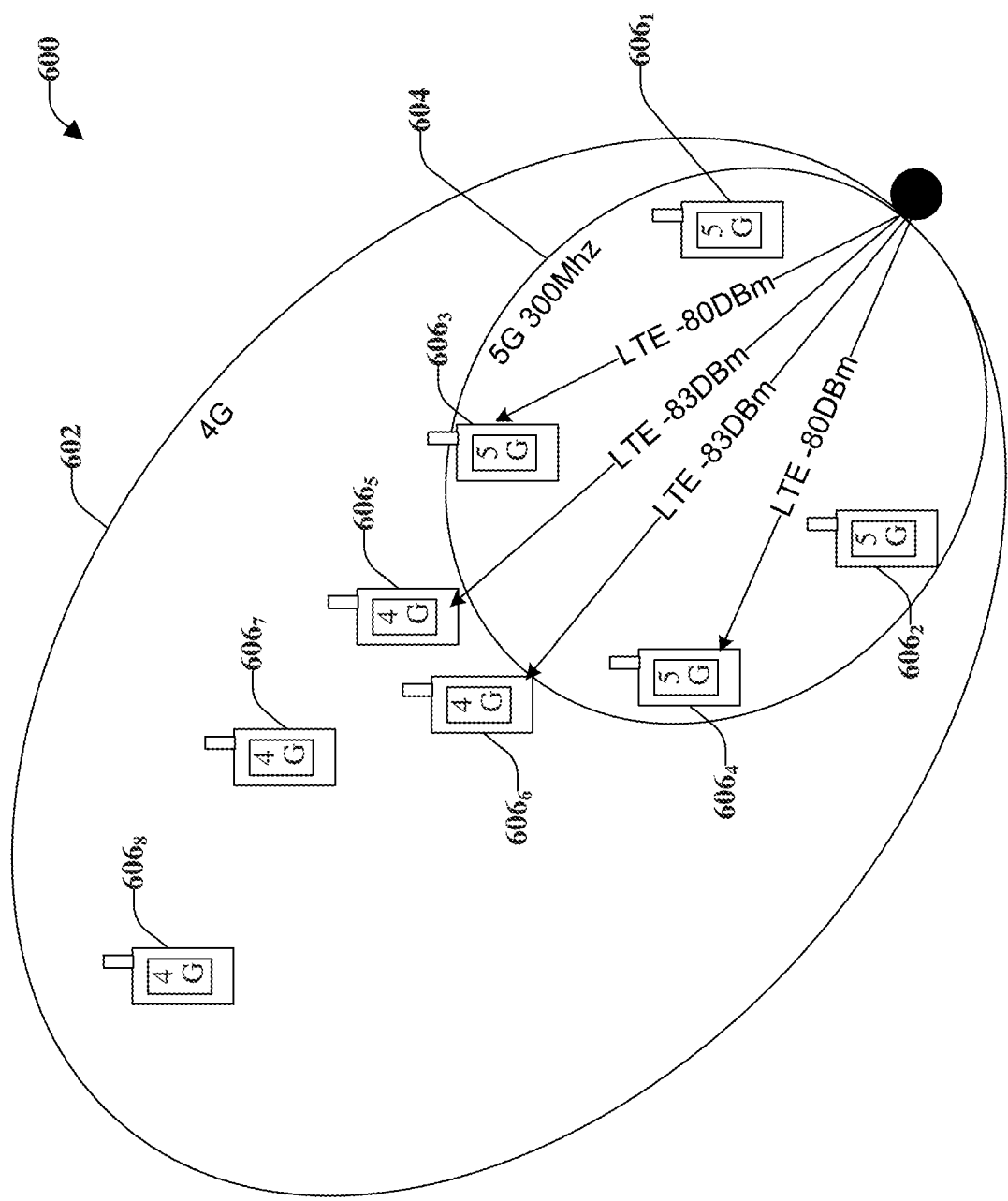
FIG. 6 illustrates an example, non-limiting, representation of a communications network in a baseline scenario, which has a full bandwidth 5G carrier in accordance with one or more embodiments described herein.

For purposes of explanation, FIG. 6 illustrates an example, non-limiting, representation of a communications network 600 in a baseline scenario, which has a full bandwidth 5G carrier in accordance with one or more embodiments described herein. The communications network 600 comprises a 4G sector 602 (represented by the large oval shaped area) and a 5G sector 604 (represented by the small oval shaped area).

It is noted that the antenna patterns illustrated are over simplified. In reality, the MM wave is a composite of individual beams. Thus, according to various implementations, the disclosed aspects can apply to beam forming or non-beam forming antenna arrays.

Further, in the example illustrated, there are eight UE devices within the communications network 600 (e.g., within the service area of the 4G sector 602 and the 5G sector 604). The UE devices include a first UE device $606_1$, a second UE device 606₂, a third UE device 606₃, a fourth UE device 606₄, a fifth UE device 606₅, a sixth UE device 606₆, a seventh UE device 606₇, and an eighth UE device 606₈.

The first UE device 606₁, the second UE device 606₂, the third UE device 606₃, and the fourth UE device 606₄ are located within, and serviced by LTE and 5G (e.g., the 4G sector 602 and the 5G sector 604), which are the captured devices. Further, the fifth UE device 606₅, the sixth UE device 606₆, the seventh UE device 606₇, and the eighth UE device 606₈ are located within, and are serviced by the 4G sector 602, and are out of range of the 5G sector 604 (e.g., using LTE only). Accordingly, the 5G capture rate of this example is fifty percent (50%).

It is also noted that the 5G edge UE devices (e.g., the third UE device 606₃ and the fourth UE device 606₄) measure LTE P-cell at −80 DBm (5G 300 MHz LTE min=−80 DBm). DBm is the power ratio in decibels (dB) of the measured power referenced to one milliwatt. Further, the fifth UE device 606₅ and the sixth UE device 606₆, measure LTE cell at −83 DBm. Accordingly, these two UE devices are within three dB of 5G MHz LTE min, and are most likely to be captured (it is noted that other dB values can be utilized with the disclosed aspects). Thus, there is a 5G capture rate gain opportunity of 25% (e.g., by capturing the fifth UE device 606₅ and the sixth UE device 606₆).

Figure 7:
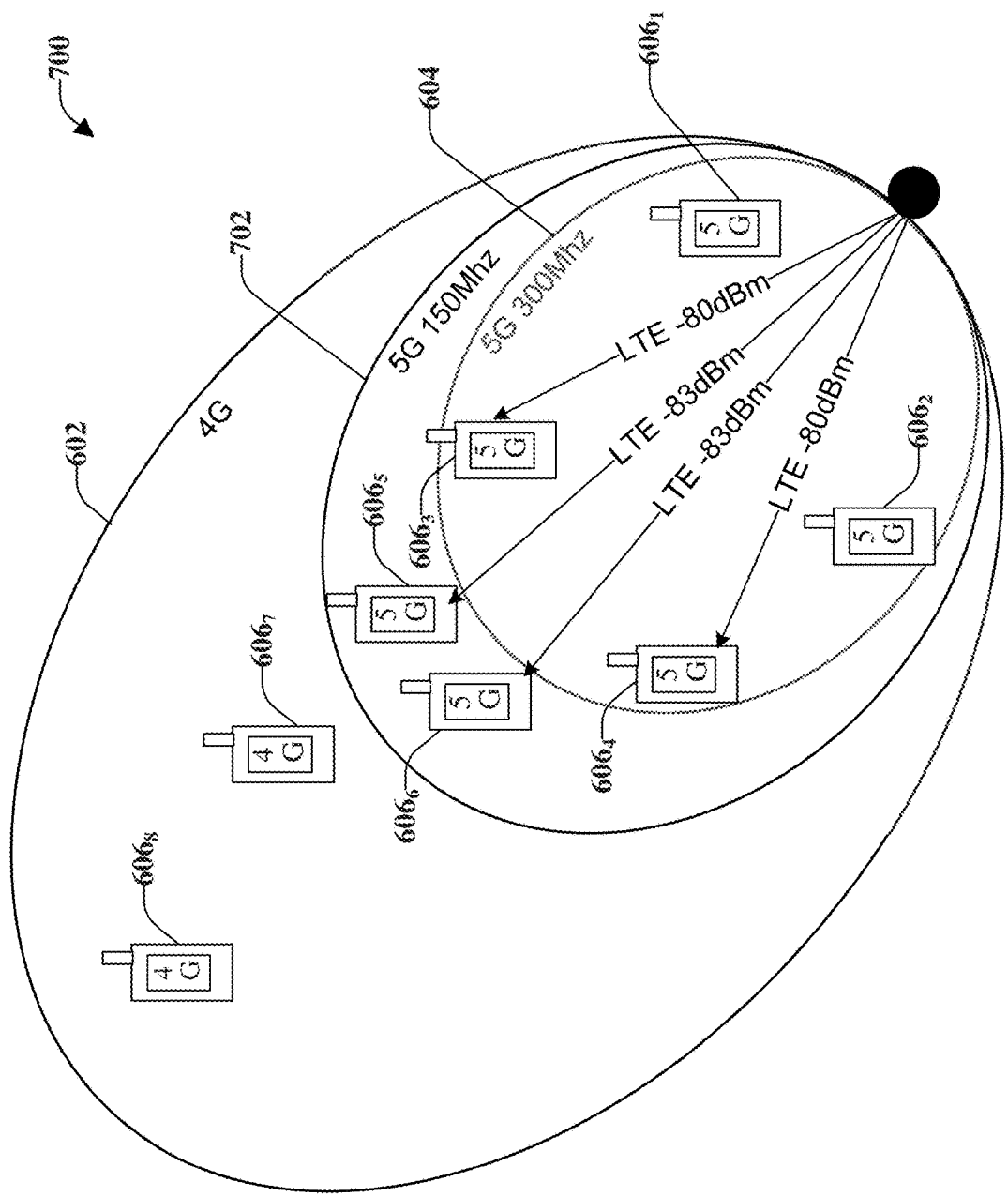
FIG. 7 illustrates an example, non-limiting, representation of a communications network in an adaptation scenario in accordance with one or more embodiments described herein.

FIG. 7 illustrates an example, non-limiting, representation of a communications network 700 in an adaptation scenario in accordance with one or more embodiments described herein. Repetitive description of like elements employed in other embodiments described herein is omitted for sake of brevity.

In the adaptation scenario of FIG. 7, there is a three dB power spectral density increase. For example, a bandwidth reduction from 300 Mhz (e.g., the 5G sector 602) to 150 Mhz (e.g., a TG 150 MHz sector 702) can yield a three dB (all values herein are approximate) power spectral density increase for 5G (LTE remains the same). It is noted that other dB values can be achieved with the disclosed aspects.

Upon or after reducing the bandwidth from 300 Mhz to 150 Mhz, there are now six of the eight 5G UE devices within range and using 5G since the fifth UE device 606₅ and the sixth UE device 606₆ have been captured within 5G. These edge UE devices measure LTE P-cell at −83 dBm, as mentioned above (e.g., 5G 105 MHz LTE min=−83 DBm). The 5G capture rate is now 75% of all devices. The scenario depicted in FIG. 7 can be considered a success.

Figure 8:
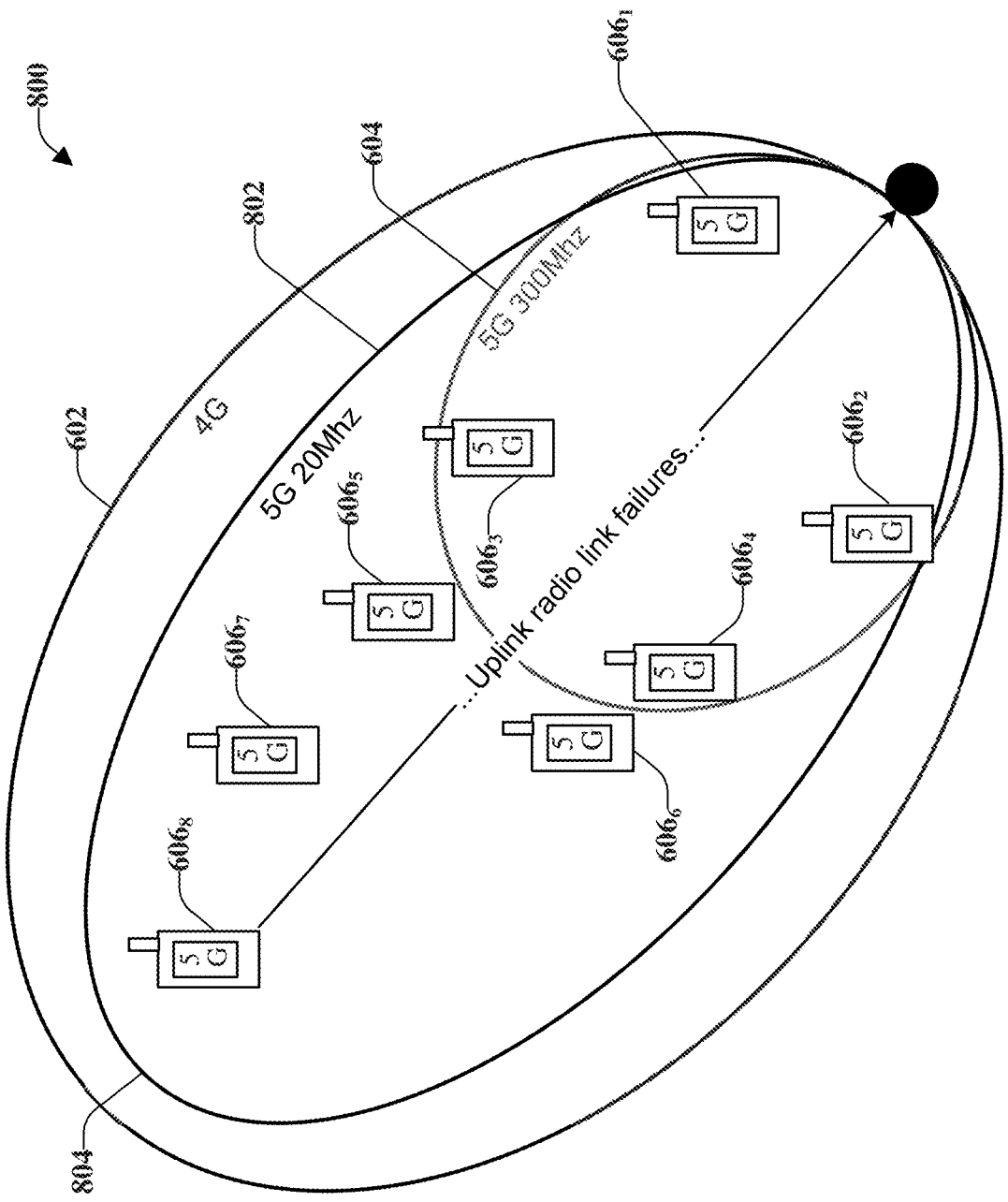
FIG. 8 illustrates an example, non-limiting, representation of a communications network in an adaptation scenario which has excessive downlink coverage in accordance with one or more embodiments described herein.

FIG. 8 illustrates an example, non-limiting, representation of a communications network 800 in an adaptation scenario which has excessive downlink coverage in accordance with one or more embodiments described herein. Repetitive description of like elements employed in other embodiments described herein is omitted for sake of brevity.

In this case, the bandwidth has been reduced from 300 MHz to 20 MHz, as denoted by the 5G 20 Mhz sector 802. In this case, all the UE devices are within the 5G sector. However, a high power spectral density (low bandwidth) pushes downlink coverage to the cell edge 804.

Further, the cell edge device (e.g., the eighth UE device 606₈) has uplink radio failures, which are caused because the downlink coverage extends beyond the uplink service area (e.g., UE power linked). This is an undesirable situation.

Figure 9:
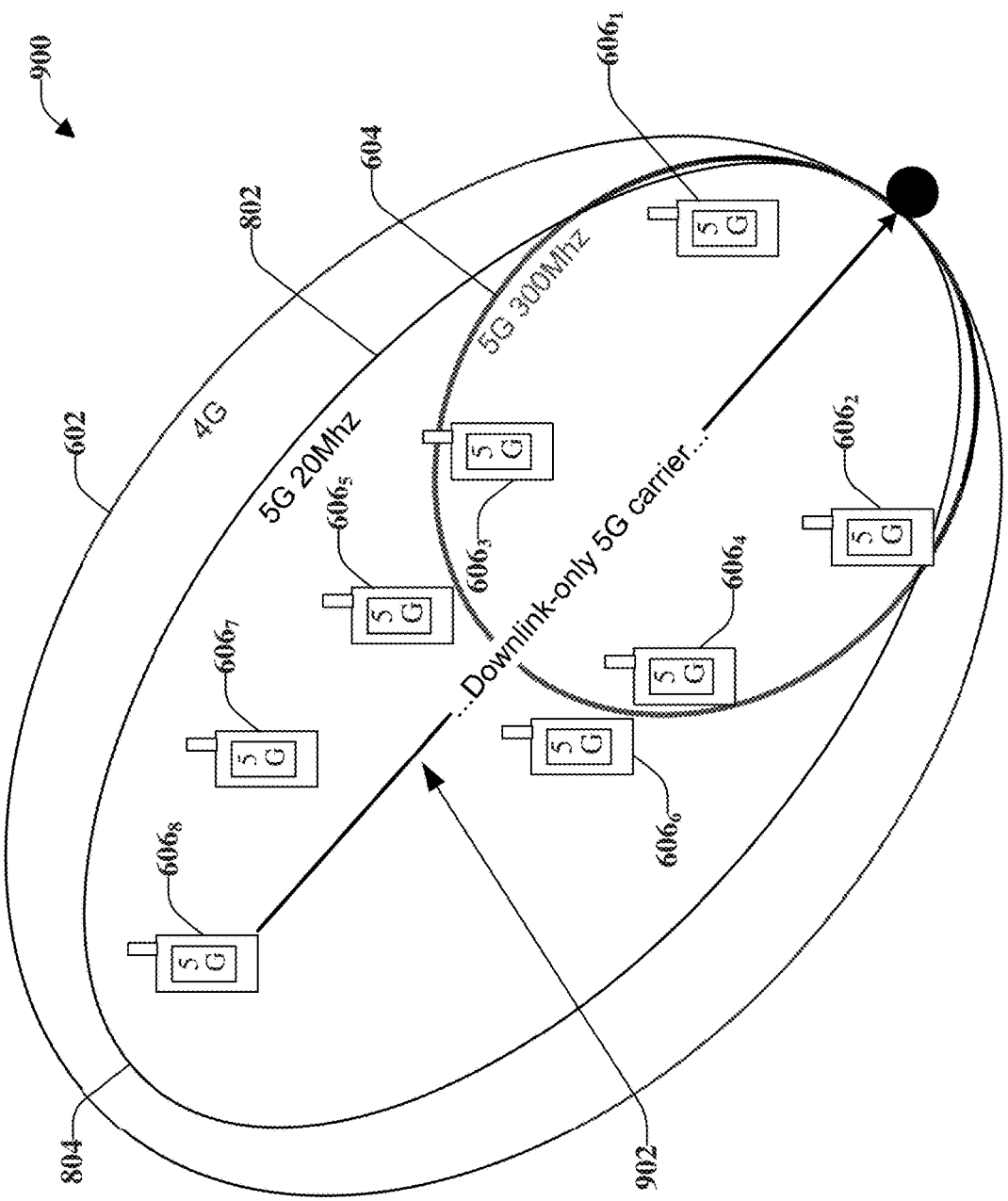
FIG. 9 illustrates an example, non-limiting, representation of a communications network that is converted to downlink only in accordance with one or more embodiments described herein.

FIG. 9 illustrates an example, non-limiting, representation of a communications network 900 that is converted to downlink only in accordance with one or more embodiments described herein. Repetitive description of like elements employed in other embodiments described herein is omitted for sake of brevity.

As mentioned with respect to FIG. 8, a high power spectral density (low bandwidth) pushes downlink coverage to the cell edge 804. To address this issue, as illustrated at 902, to avoid uplink radio link failure, PSD-extended 5G carrier can be converted to downlink only. The LTE P-cell can be used for all uplink transmissions.

Figure 10:
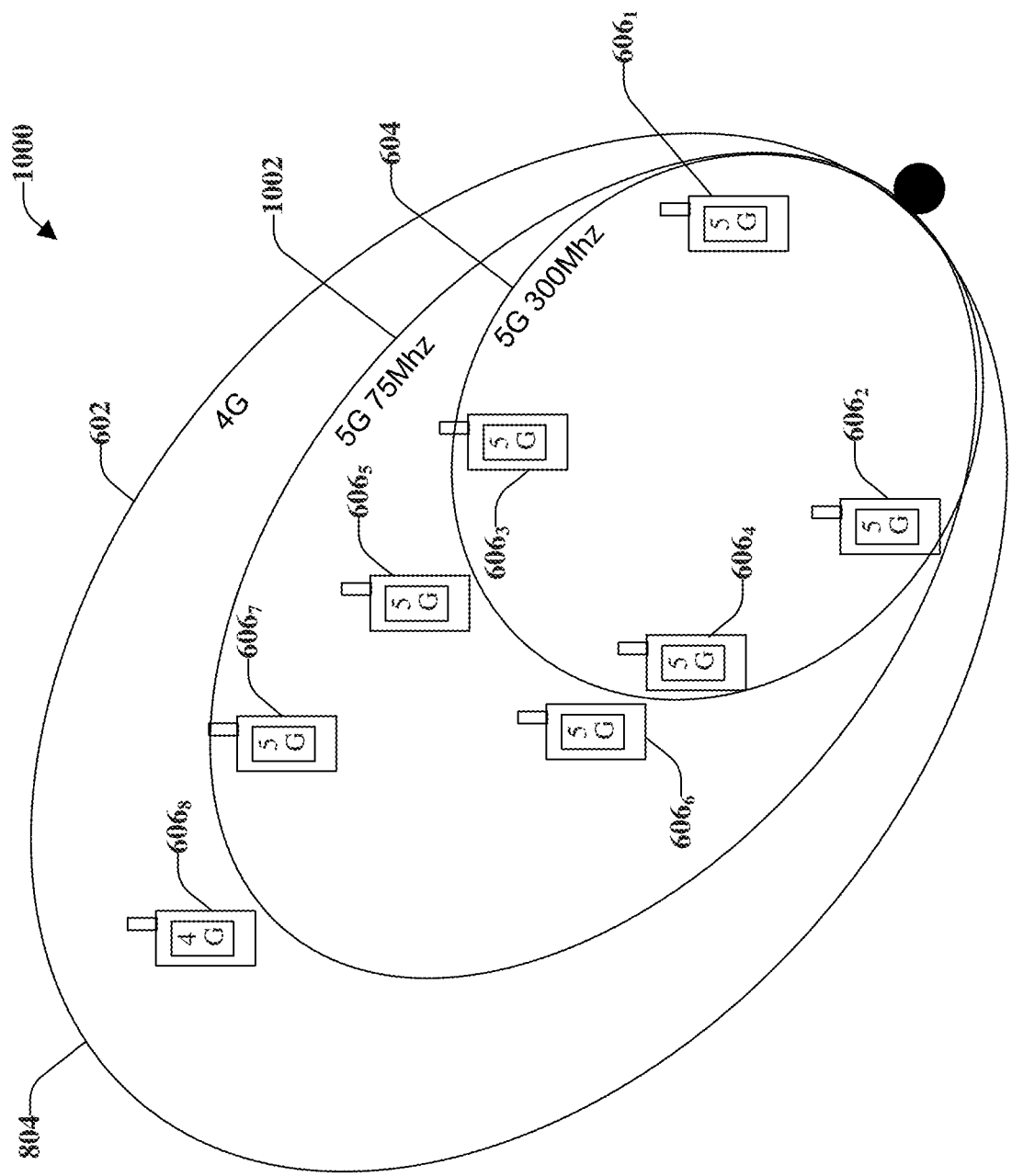
FIG. 10 illustrates an example, non-limiting, representation of a communications network in an adaptation scenario with reduced power spectral density in accordance with one or more embodiments described herein.

FIG. 10 illustrates an example, non-limiting, representation of a communications network 1000 in an adaptation scenario with reduced power spectral density in accordance with one or more embodiments described herein. Repetitive description of like elements employed in other embodiments described herein is omitted for sake of brevity.

As compared to the communications network 900 of FIG. 9, the 5G carrier bandwidth increased from 20 MHz (FIG. 9) to 75 MHz (e.g., a 5G 75 MHz sector 1002), thus reducing PSD (coverage) by around 6 dB. The cell edge device (e.g., the eighth UE device 606₈) is no longer 5G ENDC attached. Accordingly, the 5G uplink radio link failures are removed.

Figure 11:
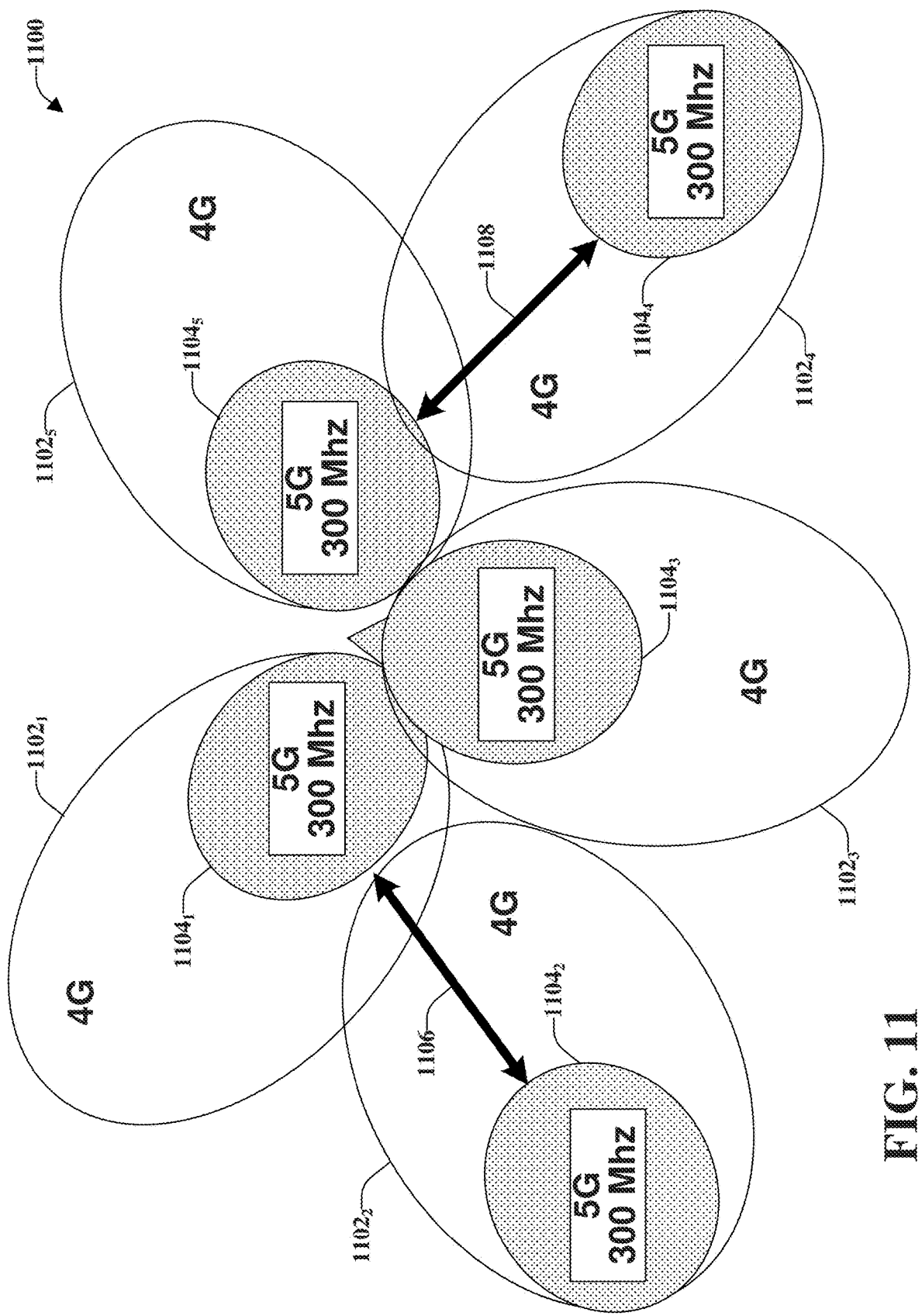
FIG. 11 illustrates an example, non-limiting, representation of a baseline scenario from a cluster perspective in accordance with one or more embodiments described herein.

FIG. 11 illustrates an example, non-limiting, representation of a baseline scenario from a cluster perspective 1100 in accordance with one or more embodiments described herein. Repetitive description of like elements employed in other embodiments described herein is omitted for sake of brevity.

Illustrated are five sectors, each comprising a 4G (e.g., LTE) coverage area and a 5G and 4G coverage area, which is a smaller coverage area than the respective 4G coverage areas. For example, illustrated are a first 4G coverage area 1102₁ and associated first 5G 300 MHz coverage area 1104₁, a second 4G coverage area 1102₂ and associated second 5G 300 MHz coverage area 1104₂, a third 4G coverage area 1102₃ and associated third 5G 300 MHz coverage area 1104₃, a fourth 4G coverage area 1102₄ and associated fourth 5G 300 MHz coverage area 1104₄, and a fifth 4G coverage area 1102₅ and associated fifth 5G 300 MHz coverage area 1104₅.

Figure 12:
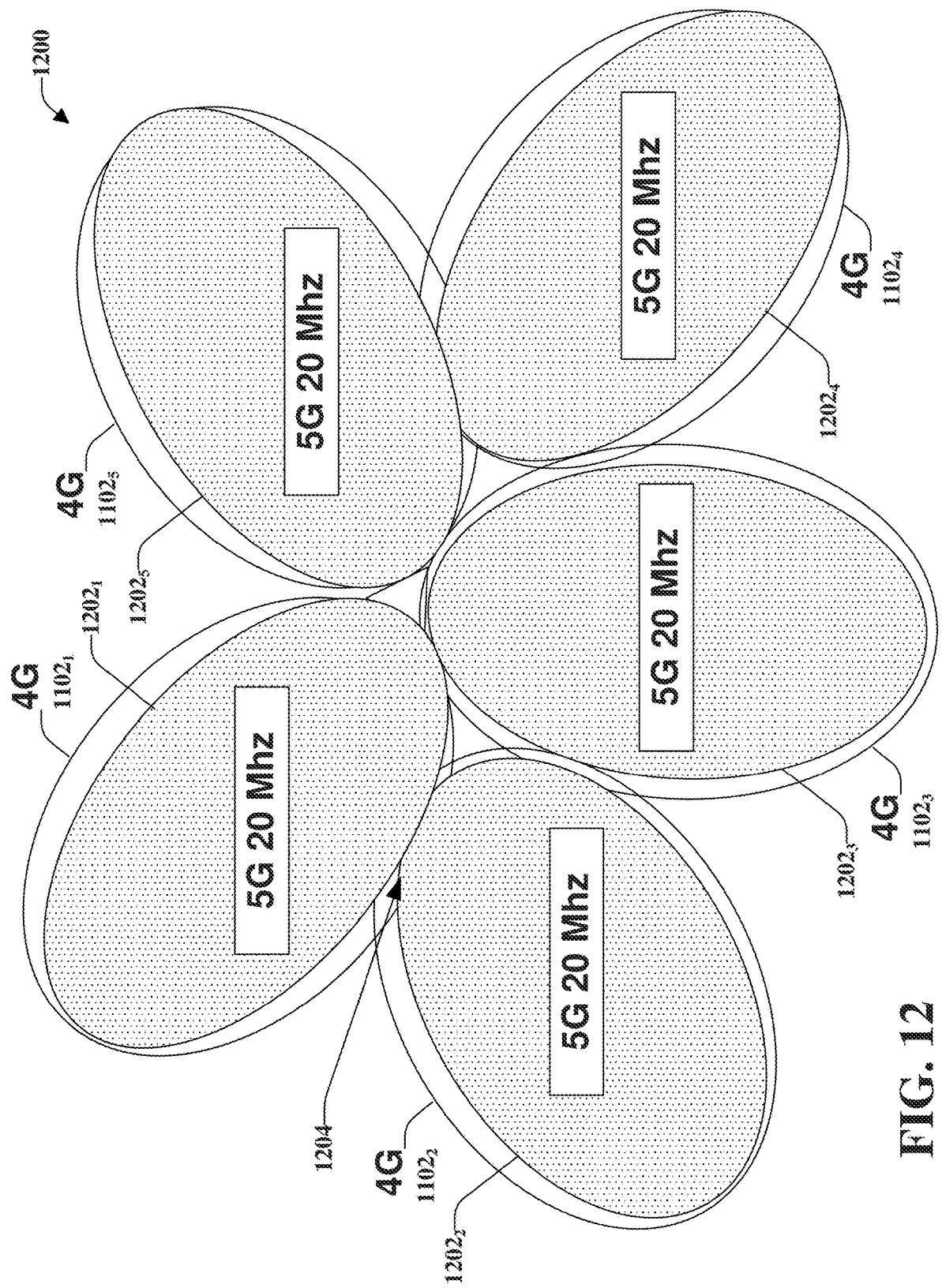
FIG. 12 illustrates an example, non-limiting, representation of an adaptation scenario from a cluster perspective in accordance with one or more embodiments described herein.

In the baseline scenario illustrated in FIG. 11, there is low PSD and 5G coverage gaps. For example, a few 5G coverage gaps are illustrated by arrow 1106 and arrow 1108. To address the 5G coverage gaps, the bandwidth can be reduced. For example, the bandwidth can be reduced from the 300 MHz to 20 MHz. FIG. 12 illustrates an example, non-limiting, representation of an adaptation scenario from a cluster perspective 1200 in accordance with one or more embodiments described herein. Repetitive description of like elements employed in other embodiments described herein is omitted for sake of brevity.

In this scenario, the 5G bandwidth has been reduced to 20 MHz. Accordingly, the first 4G coverage area 1102₁ has an associated first 5G 20 MHz coverage area 1202₁, the second 4G coverage area 1102₂ has an associated first 5G 20 MHz coverage area 1202₂, the third 4G coverage area 1102₃ has an associated first 5G 20 MHz coverage area 1202₃, the fourth 4G coverage area 1102₄ has an associated first 5G 20 MHz coverage area 1202₄, and a fifth 4G coverage area 1102₅ has an associated first 5G 20 MHz coverage area 1202₅.

Figure 13:
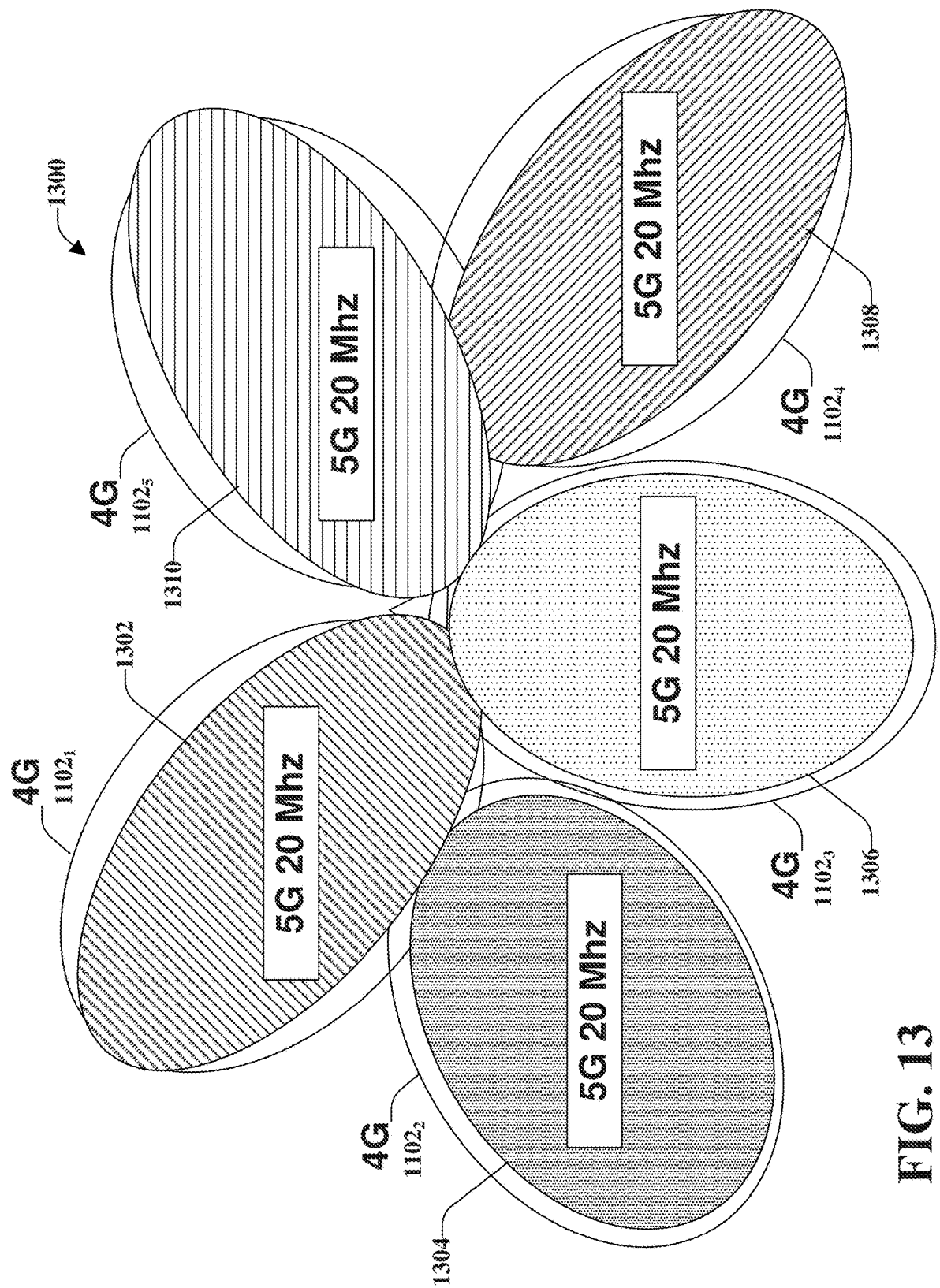
FIG. 13 illustrates an example, non-limiting, representation of an adaptation scenario with high power spectral density and chromatic spectrum optimization from a cluster perspective in accordance with one or more embodiments described herein.

As illustrated, there are fewer 5G coverage gaps after the carrier size is changed from 300 MHz to 20 MHz. However, as indicated at 1204, there is high interference in areas of overlapping coverage. Thus, there is poor performance and throughput at the cell edge (e.g., indicated at 1204). To address this interference issue, FIG. 13 illustrates an example, non-limiting, representation of an adaptation scenario with high power spectral density and chromatic spectrum optimization from a cluster perspective 1300 in accordance with one or more embodiments described herein. Repetitive description of like elements employed in other embodiments described herein is omitted for sake of brevity.

Figure 14:
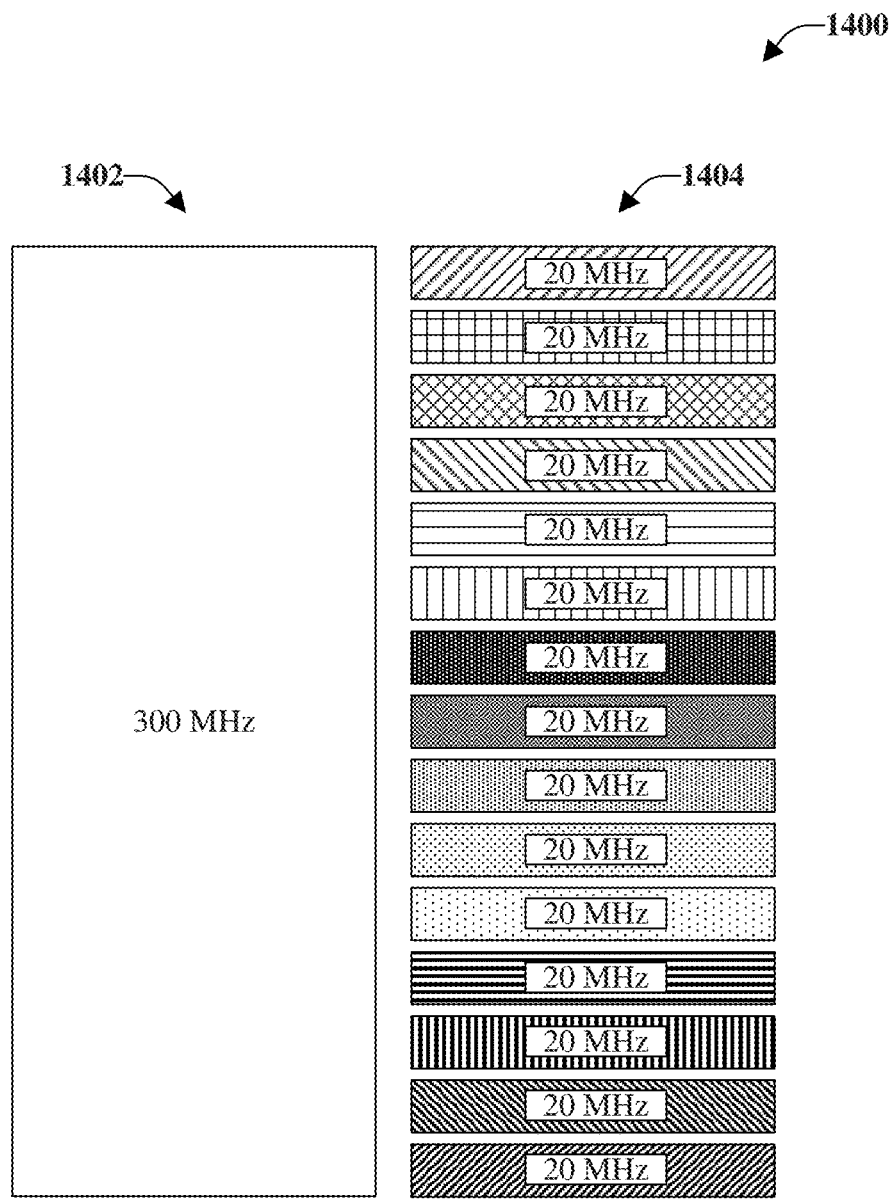
FIG. 14 illustrates an example, non-limiting, schematic representation of a 300 MHz carrier being rastered into "chromatic" slices in accordance with one or more embodiments described herein.

In this scenario, overlapping neighbor cells can use a different 20 MHz slice of the 300 MHz MM wave carrier. For example, FIG. 14 illustrates an example, non-limiting, schematic representation of a 300 MHz carrier being rastered into "chromatic" slices in accordance with one or more embodiments described herein. As depicted a 300 MHz carrier 1402 is rastered into fifteen (15) 20 MHz slices, as indicated at 1404.

With reference again to FIG. 13, a first 20 Mhz slice of the fifteen 20 MHz slices is assigned to the first 5G 20 Mhz sector 1302, a second 20 Mhz slice of the fifteen 20 MHz slices is assigned to the second 5G 20 Mhz sector 1304, a third 20 Mhz slice of the fifteen 20 MHz slices is assigned to the third 5G 20 Mhz sector 1306, a fourth 20 Mhz slice of the fifteen 20 MHz slices is assigned to the fourth 5G 20 Mhz sector 1308, and a fifth 20 Mhz slice of the fifteen 20 MHz slices is assigned to the fifth 5G 20 Mhz sector 1310.

By using the different 20 MHz slices of the 300 MHz MM wave carrier (e.g., the first 5G 20 Mhz sector 1302, the second 5G 20 Mhz sector 1304, the third 5G 20 Mhz sector 1306, the fourth 5G 20 Mhz sector 1308, and the fifth 5G 20 Mhz sector 1310), there is much less interference at the cell edge as compared to FIG. 12. Further, combined PSD and chromatic spectrum optimization can yield the best Signal to Noise ratio and performance.

As mentioned above, reducing carrier bandwidth to increase coverage and utilization involves some tradeoffs. UE devices that were already served by 5G (with full bandwidth) will likely experience a peak throughput reduction when bandwidth is reduced. On the other hand, the 5G service area has increased and 5G UE devices that are now captured by 5G (that were previously served by LTE only) will likely experience a significant average, peak, and low throughput percentage gain when served by 5G MM wave s-cells. The evaluation of positive versus negative results can therefore require a careful and balanced review considering all factors mentioned above.

Upon review of the results, one or more of various steps can be taken. For example, if the results are determined to be positive (and the results meet targets), the network can be left "as-is" and can be monitored. If the results are positive, but missed the target, the process can be restarted (e.g., another adjustment made) after some wait/soak time (to prevent ping-pong), likely leading to additional incremental PSD adjustments. If the results are negative, the changes can be backed out (e.g., reverted to a previous status).

As discussed, provided herein is adaptive power spectral density with chromatic spectrum optimization, which is an automated self-optimizing network (SON) mechanism for balancing bandwidth, coverage, and interference in wireless networks that allow variable carrier sizes. A variety of metrics can be analyzed to identify need, opportunity, and means to re-balance spectrum and power resources to yield maximum performance gain to the largest area and user set possible. In a closed-loop system, changes are applied and results are analyzed to confirm or correct for optimal net gain.

Figure 16:
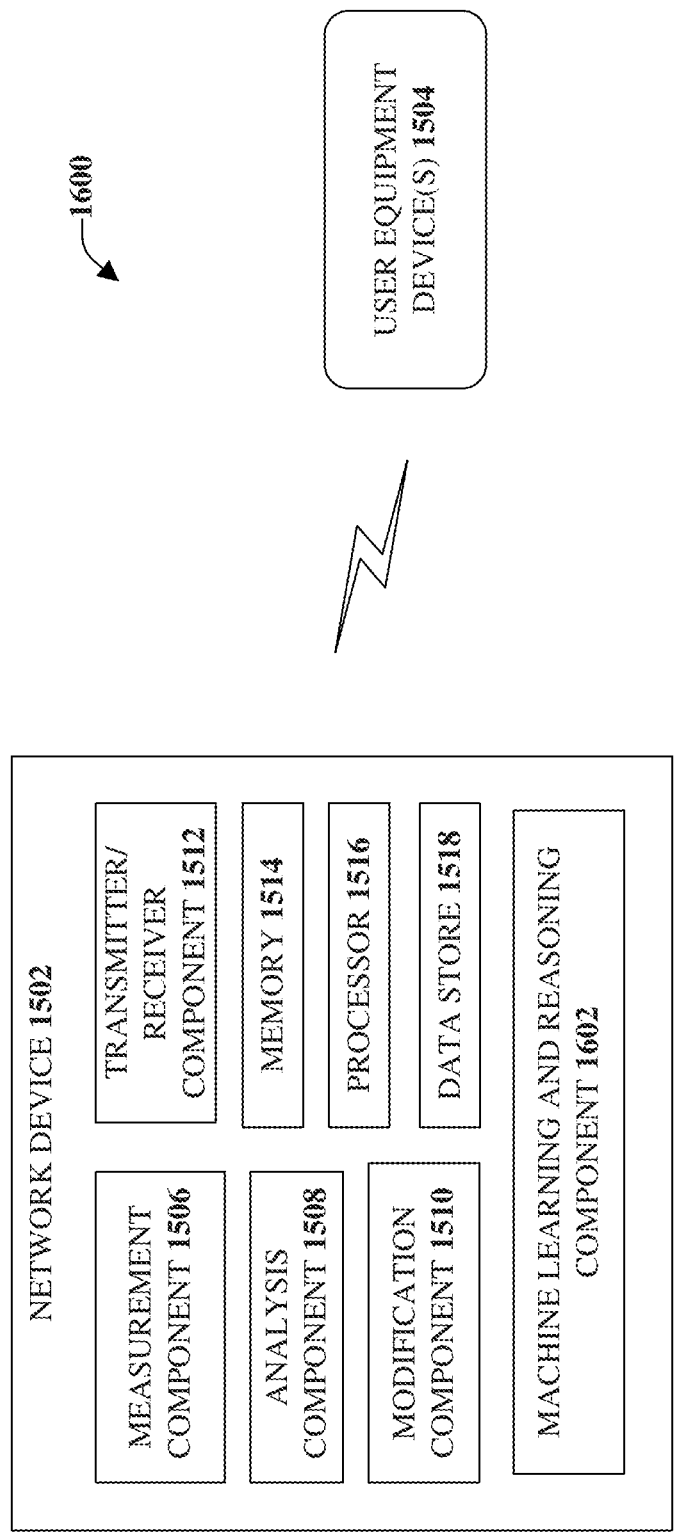
FIG. 16 illustrates an example, non-limiting, system that employs automated learning to facilitate one or more of the disclosed aspects in accordance with one or more embodiments described herein.

The disclosed aspects also include learning and adaptation techniques (e.g., artificial intelligence, a machine learning and reasoning component 1602 of FIG. 16) to yield better decisions and results over time. For example, a database of triggers, historical changes, and impacts can be updated. This database can be referred to for the implementation of change decisions in subsequent processing cycles. Accordingly, artificial intelligence (e.g., machine learning and reasoning) capabilities can be provided with the disclosed aspects. For example, the disclosed aspects can initially make adjustments based upon rough estimations, measurements, and recorded results (as discussed herein). Closed loop feedback mechanisms can initially require more than one incremental change (PSD and center frequency, for example) to achieve the intended result. Each of these iterations can contribute to tables of symptoms, adjustments, and results that can be consolidated and referenced by future iterations. Over time, individual adjustments can become more precise and desired results can be achieved with fewer iterations.

Figure 15:
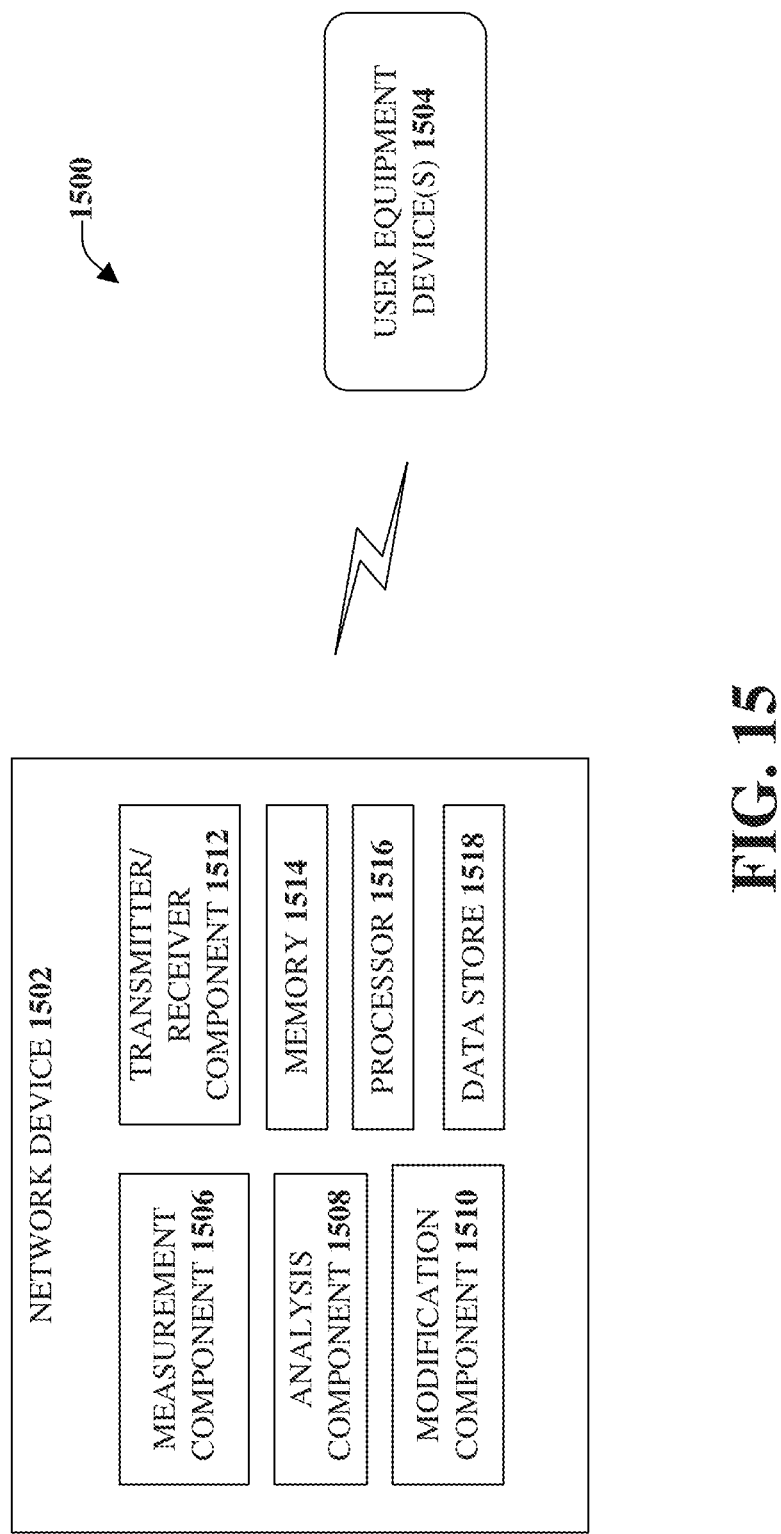
FIG. 15 illustrates an example, non-limiting, system for facilitating adaptive power spectral density with chromatic spectrum optimization in advanced networks in accordance with one or more embodiments described herein.

With reference now to FIG. 15, illustrated is an example, non-limiting, system 1500 for facilitating adaptive power spectral density with chromatic spectrum optimization in advanced networks in accordance with one or more embodiments described herein. Aspects of systems (e.g., the system 1500 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 1500 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 1500 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 15, the system 1500 can include a network device 1502 and a user equipment (UE) device 1504. The network device 1502 can be included in a group of network devices of a wireless network. Although only one user equipment device and a single network device are shown and described, the various aspects are not limited to this implementation. Instead, multiple user equipment devices and/or multiple network devices can be included in a communications system.

The network device 1502 can include a measurement component 1506, an analysis component 1508, a modification component 1510, a transmitter/receiver component 1512, at least one memory 1514, at least one processor 1516, and at least one data store 1518. The measurement component 1506 can quantify a first number of user equipment devices that are utilizing a 5G spectrum of a radio access network. Further, the measurement component 1506 can quantify a second number of user equipment devices that are utilizing and a 4G (e.g., a LTE) spectrum. For example, it can be determined that there are ten UE devices within the coverage area of the 4G spectrum and that there are five UE devices (of those ten UE devices) that are also within the coverage area of the 5G spectrum. It can be determined that at least some of the five UE devices that are not currently within the coverage area of the 5G spectrum, could come within its coverage based on one or more adjustments of the power spectral density.

The analysis component 1508 can determine whether a first utilization level of network devices of a radio access network is below a defined utilization threshold. For example, the analysis component 1508 can compare a utilization level of network devices of the radio access network to the defined utilization threshold and can determine whether the utilization level satisfies the defined utilization threshold or does not satisfy the defined utilization threshold.

If the first utilization level is at or above the defined utilization threshold, no action is taken. However, if the first utilization is below (e.g., does not satisfy the defined utilization threshold), adjustments can be made to the power spectral density of the network devices of the radio access network. The adjustment by the modification component 1510 can be in increments. For example, the modification component 1510 can adjust the power spectral density by a defined amount based on the second utilization level determined for the network devices of the radio access network. The second utilization level can comprise a second number of user equipment devices using the millimeter wave spectrum of the radio access network. In accordance with some implementations, the second number of user equipment devices is greater than the first number of user equipment devices.

According to some implementations, the measurement component 1506 can perform another measurement of a realized utilization level after the modification component 1510 adjusts the power spectral density. The realized utilization level can comprise an actual number of user equipment devices using the millimeter wave spectrum of the radio access network after the performing the adjustment of the power spectral density.

The analysis component 1508 can compare the realized utilization level with the second utilization level. If the realized utilization level has not increased to the second utilization level (e.g., not enough UE devices were captured as expected), the modification component 1510 can perform a second adjustment to the power spectral density by a second defined value (e.g., a second incremental value) based on a determination that the realized utilization level is less than the second utilization level and is greater than the first utilization level.

According to some implementations, prior to performing the second adjustment to the power spectral density, the modification component 1510 can wait a defined time interval. Upon or after expiration of the defined time interval, the modification component 1510 can perform an incremental change to the power spectral density. The incremental change can be similar to the first change or can be a different change. For example, the first change can be reducing the bandwidth by fifty percent and the second change can be reducing the bandwidth by another fifty percent. However, the disclosed aspects are not limited to a fifty percent reduction in bandwidth and other values can be utilized.

According to some implementations, if the change made by the modification component 1510 is determined to cause other issues (e.g., an increase in call drop rate, a determination that the realized utilization level is less than the first utilization level, and so on), the modification component 1510 can reverse the adjustment to the power spectral density (e.g., place the system back in its original or previous configuration).

In some implementations, the analysis component 1508 can evaluate a result of the adjustment of the power spectral density of the network devices of the radio access network. Further, the result can be retained (e.g., in the at least one memory 1514, or another storage media or database) as historical data for an adjustment decision in a subsequent process cycle.

The transmitter/receiver component 1512 can be configured to transmit to, and/or receive data from, the UE device 1504, other network devices, and/or other UE devices. Through the transmitter/receiver component 1512, the network device 1502 can concurrently transmit and receive data, can transmit and receive data at different times, or combinations thereof. According to some implementations, the transmitter/receiver component 1512 can facilitate communications between the network device 1502 and the UE device 1504.

The at least one memory 1514 can be operatively connected to the at least one processor 1516. The at least one memory 1514 can store executable instructions that, when executed by the at least one processor 1516 can facilitate performance of operations. Further, the at least one processor 1516 can be utilized to execute computer executable components stored in the at least one memory 1514.

For example, the at least one memory 1514 can store protocols associated with facilitating adaptive power spectral density with chromatic spectrum optimization in advanced networks as discussed herein. Further, the at least one memory 1514 can facilitate action to control communication between the network device 1502, the UE device 1504, other network devices, and/or other UE devices such that the network device 1502 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 1516 can facilitate respective analysis of information related to facilitating adaptive power spectral density with chromatic spectrum optimization in advanced networks. The at least one processor 1516 can be a processor dedicated to analyzing and/or generating information received, a processor that controls one or more components of the network device 1502, and/or a processor that both analyzes and generates information received and controls one or more components of the network device 1502.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 1502) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

FIG. 16 illustrates an example, non-limiting, system 1600 that employs automated learning to facilitate one or more of the disclosed aspects in accordance with one or more embodiments described herein. Repetitive description of like elements employed in other embodiments described herein is omitted for sake of brevity. The system 1600 can comprise one or more of the components and/or functionality of the system 1500 and vice versa.

As illustrated, the system 1600 can comprise a machine learning and reasoning component 1602 that can be utilized to automate one or more of the disclosed aspects. The machine learning and reasoning component 1602 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 1602 can employ principles of probabilistic and decision theoretic inference. Additionally, or alternatively, the machine learning and reasoning component 1602 can rely on predictive models constructed using machine learning and/or automated learning procedures. Logic-centric inference can also be employed separately or in conjunction with probabilistic methods.

The machine learning and reasoning component 1602 can infer implementation of change decisions by obtaining knowledge about historical conditions, historical modifications, and historical outcomes. Based on this knowledge, the machine learning and reasoning component 1602 can make an inference based on which actions to implement by bypassing one or more incremental changes. For example, if a previous situation involved improves to 5G coverage based on multiple iterations that increased a PSD by 3 dB (e.g., a total of 9 dB) while halving the bandwidth (e.g., from 300 MHz to 75 MHz), the machine learning and reasoning component 1602 can infer that a single increase of the PSD by 9 dB and reducing the bandwidth to 75 MHz should automatically be implemented.

As used herein, the term "inference" refers generally to the process of reasoning about or inferring states of a system, a component, a module, an environment, and/or devices from a set of observations as captured through events, reports, data and/or through other forms of communication. Inference can be employed to identify a specific condition, modification, and/or effect, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with facilitating adaptive power spectral density with chromatic spectrum optimization) can employ various artificial intelligence-based schemes for carrying out various aspects thereof. For example, a process for determining if a particular action should be taken based on a comparison between current conditions and historical conditions and outcomes can be enabled through an automatic classifier system and process.

A classifier is a function that maps an input attribute vector, $x=(x1, x2, x3, x4, xn)$, to a confidence that the input belongs to a class. In other words, $f(x)=$confidence(class). Such classification can employ a probabilistic and/or statistical-based analysis (e.g., factoring into the analysis utilities and costs) to provide a prognosis and/or infer one or more actions that should be employed to determine what action to be automatically performed.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by retaining a database of triggers, historical changes, and impacts). For example, SVMs can be configured through a learning or training phase within a classifier constructor and feature selection module. Thus, a classifier(s) can be used to automatically learn and perform a number of functions, including but not limited to referring to the historical information for the implementation of change decisions in subsequent processing cycles, facilitating more precise individual adjustments and desired results with fewer iterations, and so forth.

Accordingly, the disclosed aspects include a self-learning system. For example, for every change and effect (e.g., modification and result), a database can be created. Over time the database of changes and results is built and used as an input to the machine learning and reasoning component 1602 (or an artificial intelligence algorithm) so that the next time the same (or a similar) condition occurs, and the goal is to achieve a defined target, instead of implementing small changes as in the trial and error methods discussed herein, a large change that worked in the past could be used. Reference is made back to the history of changes and results to make the next change more effective on the first try (or a couple of tries). Result verification can then be performed. The database can gather more data (e.g., changes and effects) over time and have a more and more accurate estimation of the kind of change require to achieve a specific outcome (e.g., training a model). Over time that database and its accuracy can lead to a faster response. Instead of having to take three different PSD steps to get to the goal, it might only take one or two steps. This can also potentially make all these adaptations much faster. For example, if a new site is added, it can be beneficial to cause the system to readjust quickly after that new cell site is added. Accordingly, there can be a higher probability to update the entire cluster around that new cite in one step versus multiple steps. Further, as the network evolves and gets new data, the model can be retrained.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 17:
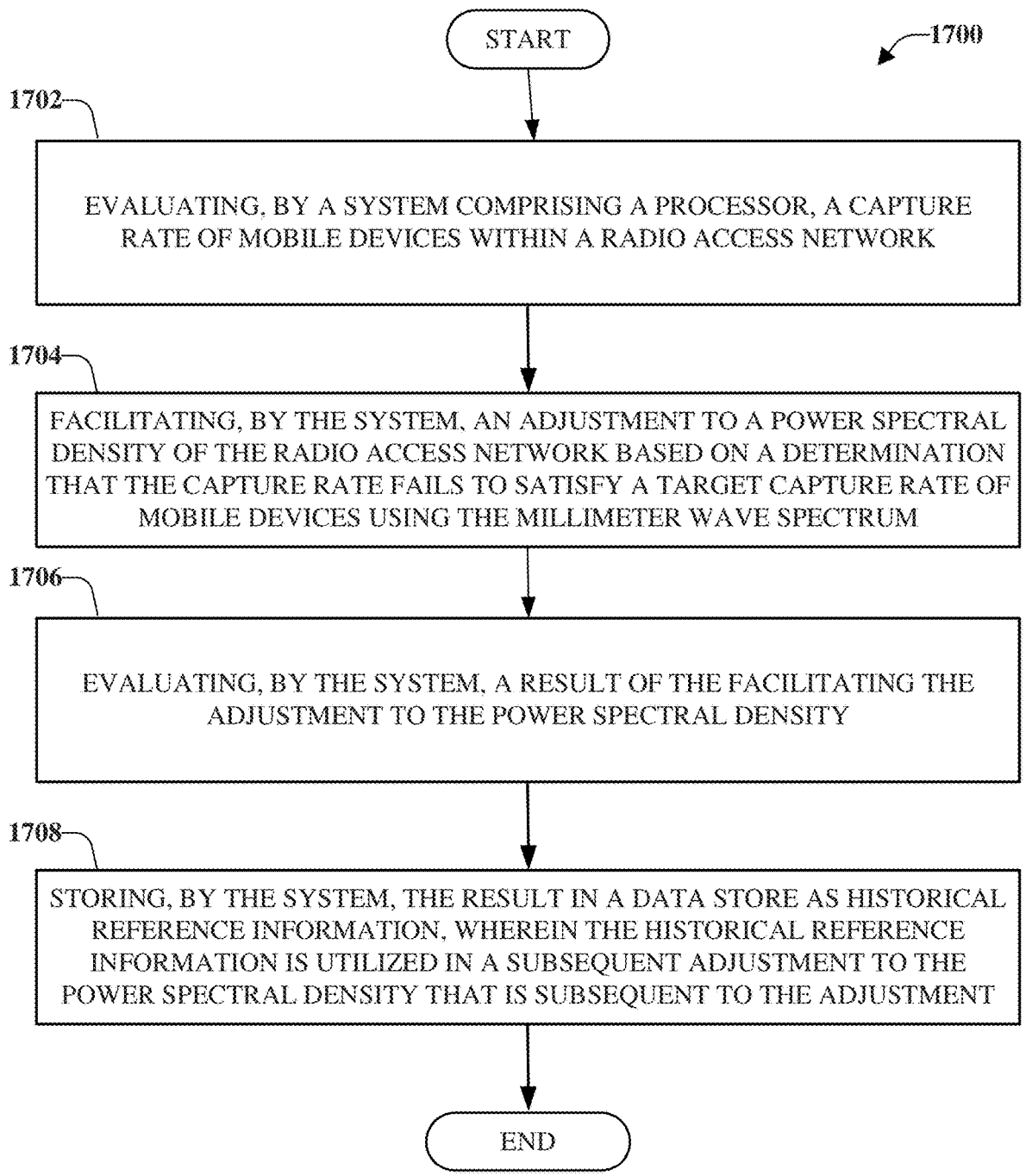
FIG. 17 illustrates a flow diagram of an example, non-limiting, computer-implemented method for facilitating adaptive power spectral density with chromatic spectrum optimization in advanced networks in accordance with one or more embodiments described herein.

FIG. 17 illustrates a flow diagram of an example, non-limiting, computer-implemented method 1700 for facilitating adaptive power spectral density with chromatic spectrum optimization in advanced networks in accordance with one or more embodiments described herein. Repetitive description of like elements employed in other embodiments described herein is omitted for sake of brevity.

In some implementations, a system comprising a processor can perform the computer-implemented method 1700 and/or other methods discussed herein. In other implementations, a device comprising a processor can perform the computer-implemented method 1700 and/or other methods discussed herein. In other implementations, a machine-readable storage medium, can comprise executable instructions that, when executed by a processor, facilitate performance of operations, which can be the operations discussed with respect to the computer-implemented method 1700 and/or other methods discussed herein. In further implementations, a computer readable storage device comprising executable instructions that, in response to execution, cause a system comprising a processor to perform operations, which can be operations discussed with respect to the computer-implemented method 1700 and/or other methods discussed herein.

At 1702 of the computer-implemented method 1700, a system comprising a processor can evaluate a capture rate of mobile devices within a radio access network. The capture rate can be representative of a quantity of mobile devices using a millimeter wave spectrum of the radio access network.

Further, at 1704 of the computer-implemented method 1700, the system can facilitate an adjustment to a power spectral density of the radio access network based on a determination that the capture rate fails to satisfy a target capture rate of mobile devices using the millimeter wave spectrum. According to some implementations, facilitating the adjustment can comprise facilitating the adjustment by a first amount determined based on a difference between the capture rate and the target capture rate.

According to some implementations, the computer-implemented method 1700 can comprise, at 1706, evaluating a result of the facilitating the adjustment to the power spectral density, as discussed herein. Further, at 1708, the result can be stored in a data store as historical reference information. The historical reference information can be utilized in a subsequent adjustment to the power spectral density that is subsequent to the adjustment.

Figure 18:
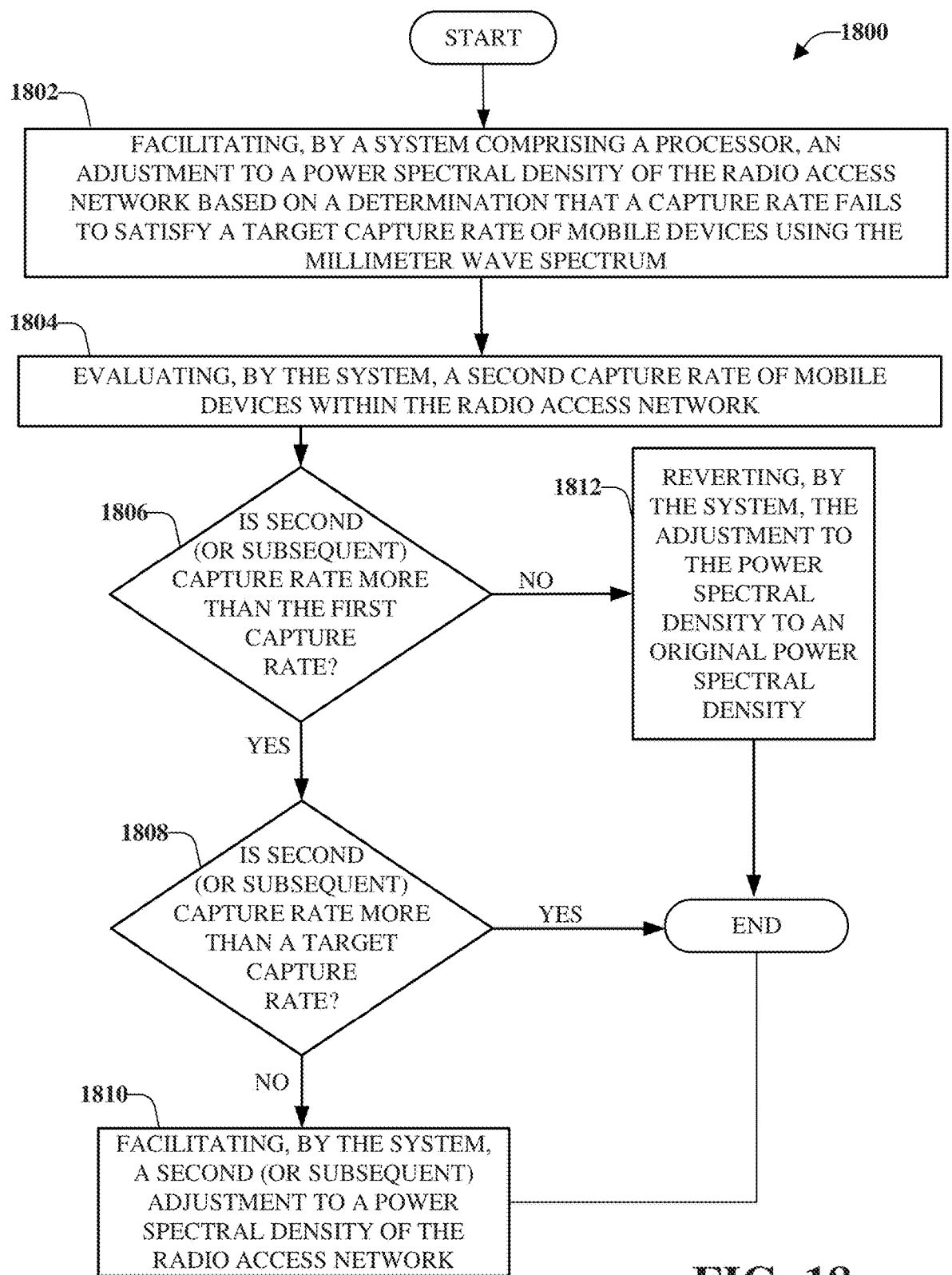
FIG. 18 illustrates a flow diagram of an example, non-limiting, computer-implemented method for confirming changes and taking additional action related to facilitating adaptive power spectral density with chromatic spectrum optimization in advanced networks in accordance with one or more embodiments described herein.

FIG. 18 illustrates a flow diagram of an example, non-limiting, computer-implemented method 1800 for confirming changes and taking additional action related to facilitating adaptive power spectral density with chromatic spectrum optimization in advanced networks in accordance with one or more embodiments described herein. Repetitive description of like elements employed in other embodiments described herein is omitted for sake of brevity.

In some implementations, a system comprising a processor can perform the computer-implemented method 1800 and/or other methods discussed herein. In other implementations, a device comprising a processor can perform the computer-implemented method 1800 and/or other methods discussed herein. In other implementations, a machine-readable storage medium, can comprise executable instructions that, when executed by a processor, facilitate performance of operations, which can be the operations discussed with respect to the computer-implemented method 1800 and/or other methods discussed herein. In further implementations, a computer readable storage device comprising executable instructions that, in response to execution, cause a system comprising a processor to perform operations, which can be operations discussed with respect to the computer-implemented method 1800 and/or other methods discussed herein.

At 1802 of the computer-implemented method 1800, a system comprising a processor can facilitate an adjustment to a power spectral density of the radio access network based on a determination that the capture rate fails to satisfy a target capture rate of mobile devices using the millimeter wave spectrum.

Upon or after the adjustment is applied, at 1804, a second capture rate of mobile devices within the radio access network can be evaluated. The second capture rate can be representative of a second quantity of mobile devices using the millimeter wave spectrum after the facilitating the adjustment to the power spectral density of the radio access network.

A first determination can be made, at 1806 of the computer-implemented method 1800, whether the second capture rate is larger than the first capture rate. If the second capture rate is larger than the first capture rate ("YES"), a second determination can be made at 1808 whether the second capture rate satisfies a target capture rate. If the second capture rate fails to satisfy the target capture rate ("NO"), at 1810 of the computer-implemented method 1800, a second adjustment to the power spectral density is performed. The second adjustment can be substantially the same as the first adjustment, or can be a different adjustment.

With reference again to the decision, at 1806, if the determination is that the second capture rate is at or lower than the first capture rate ("NO"), it indicates that the modification at 1802 had a negative effect on the wireless network. Therefore, at 1812, the computer-implemented method 1800 can revert the adjustment to the power spectral density to an original (or a previous) power spectral density.

Figure 19:
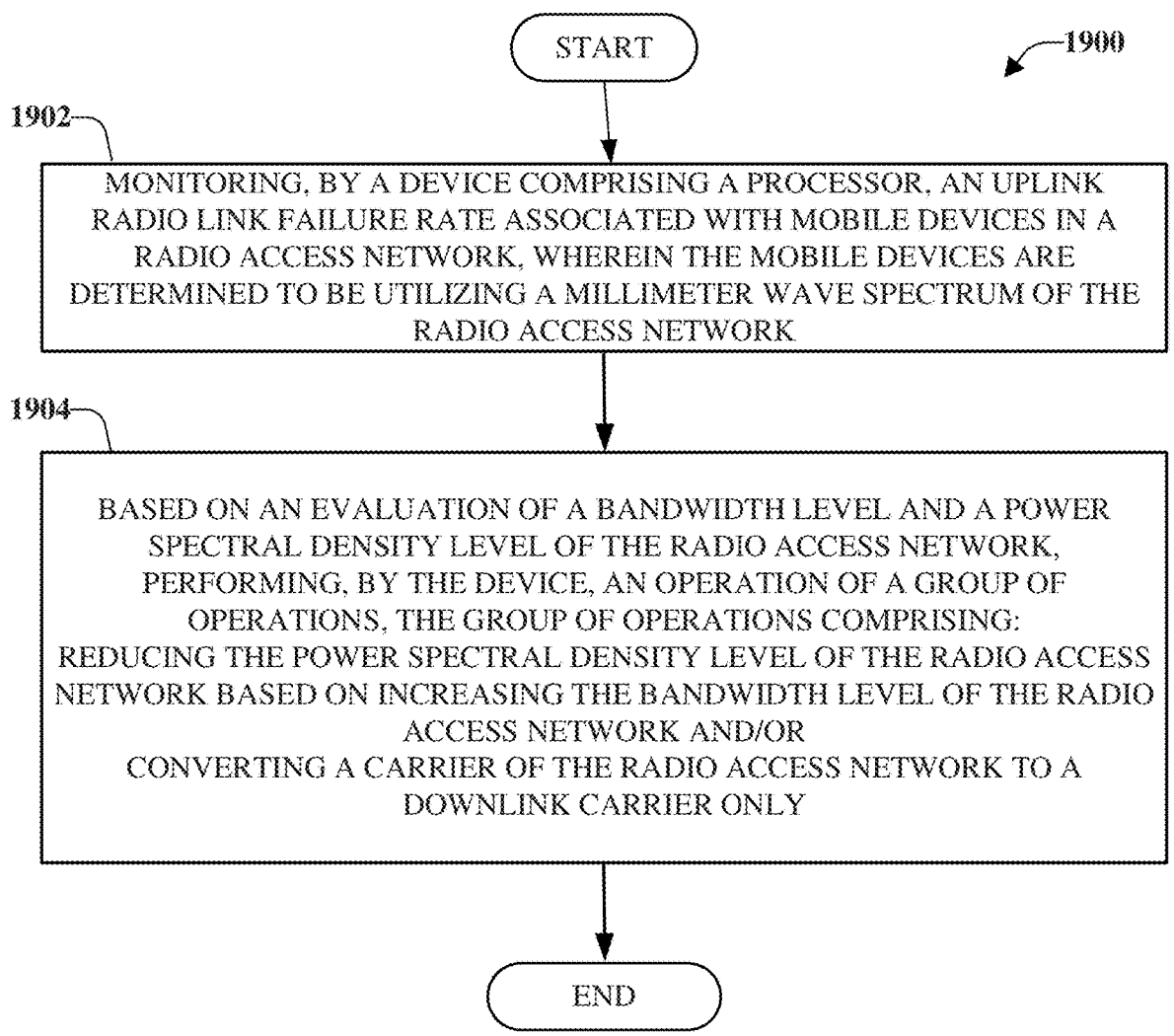
FIG. 19 illustrates a flow diagram of an example, non-limiting, computer-implemented method for monitoring uplink radio failure rates while facilitating adaptive power spectral density in advanced networks in accordance with one or more embodiments described herein.

FIG. 19 illustrates a flow diagram of an example, non-limiting, computer-implemented method 1900 for monitoring uplink radio failure rates while facilitating adaptive power spectral density in advanced networks in accordance with one or more embodiments described herein. Repetitive description of like elements employed in other embodiments described herein is omitted for sake of brevity.

In some implementations, a system comprising a processor can perform the computer-implemented method 1900 and/or other methods discussed herein. In other implementations, a device comprising a processor can perform the computer-implemented method 1900 and/or other methods discussed herein. In other implementations, a machine-readable storage medium, can comprise executable instructions that, when executed by a processor, facilitate performance of operations, which can be the operations discussed with respect to the computer-implemented method 1900 and/or other methods discussed herein. In further implementations, a computer readable storage device comprising executable instructions that, in response to execution, cause a system comprising a processor to perform operations, which can be operations discussed with respect to the computer-implemented method 1900 and/or other methods discussed herein.

The computer-implemented method 1900 starts at 1902 with monitoring an uplink radio link failure rate associated with mobile devices in a radio access network. The mobile devices can be determined to be utilizing a millimeter wave spectrum of the radio access network.

Based on an evaluation of a bandwidth level and a power spectral density level of the radio access network, at 1904, an operation of a group of operations can be performed. The group of operations can comprise reducing the power spectral density level of the radio access network based on increasing the bandwidth level of the radio access network. Further, the group of operations can comprise converting a carrier of the radio access network to a downlink carrier only.

According to some implementations, reducing the power spectral density level and increasing the bandwidth level can be based on a determination that the bandwidth level is at a defined low level and the power spectral density level is at a defined high level. Further, according to some implementations, the operations can comprise returning a center channel for minimal neighbor spectral overlap and facilitating an update of neighbor lists stored by the mobile devices.

Figure 20:
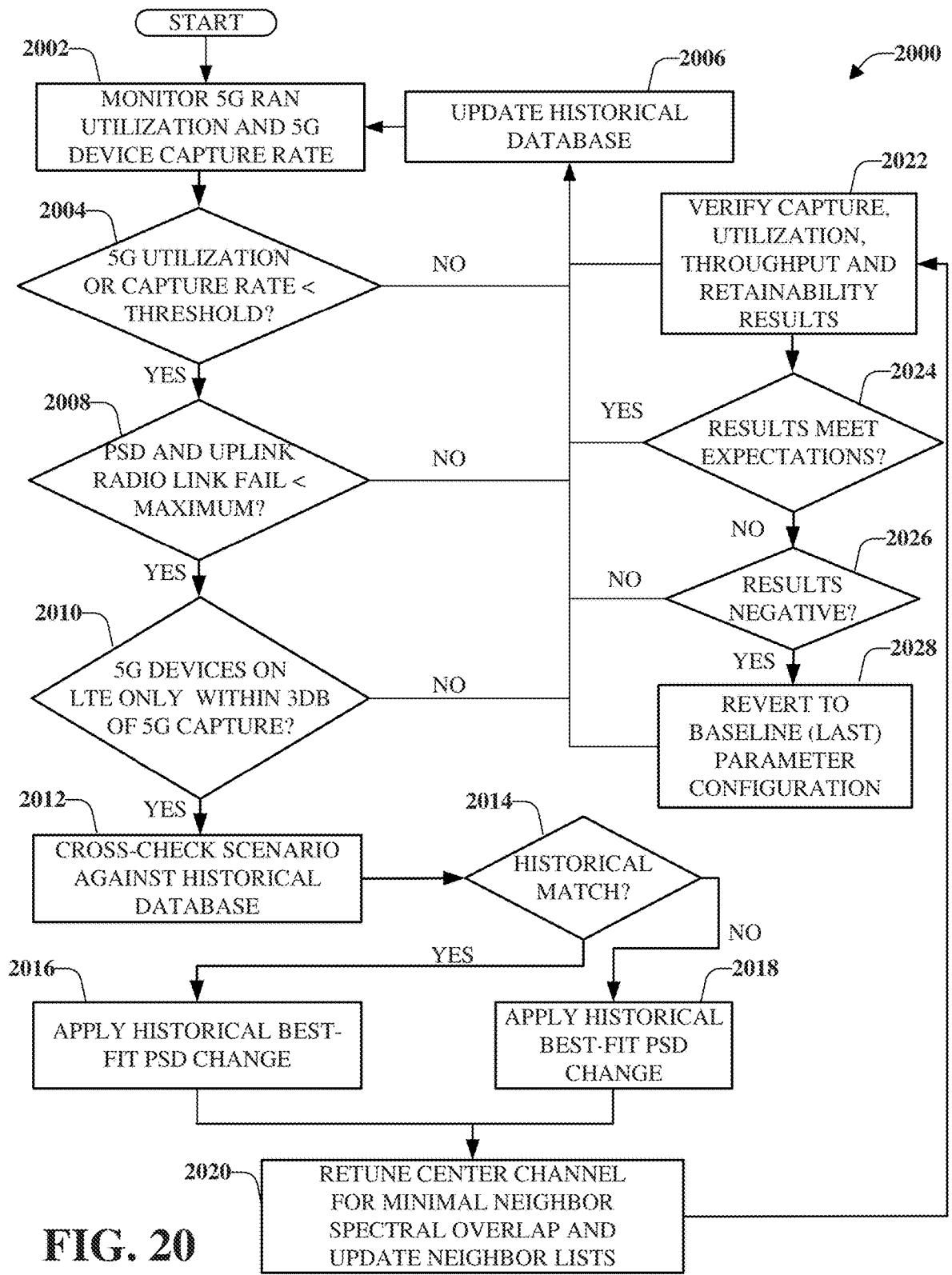
FIG. 20 illustrates a flow diagram of an example, non-limiting, computer-implemented method for facilitating power spectral density adjustments in advanced networks in accordance with one or more embodiments described herein.

FIG. 20 illustrates a flow diagram of an example, non-limiting, computer-implemented method 2000 for facilitating power spectral density adjustments in advanced networks in accordance with one or more embodiments described herein. Repetitive description of like elements employed in other embodiments described herein is omitted for sake of brevity.

In some implementations, a system comprising a processor can perform the computer-implemented method 2000 and/or other methods discussed herein. In other implementations, a device comprising a processor can perform the computer-implemented method 2000 and/or other methods discussed herein. In other implementations, a machine-readable storage medium, can comprise executable instructions that, when executed by a processor, facilitate performance of operations, which can be the operations discussed with respect to the computer-implemented method 2000 and/or other methods discussed herein. In further implementations, a computer readable storage device comprising executable instructions that, in response to execution, cause a system comprising a processor to perform operations, which can be operations discussed with respect to the computer-implemented method 2000 and/or other methods discussed herein.

The computer-implemented method 2000 starts at 2002 when a 5G RAN utilization and 5G device capture rate are monitored. Based on the monitoring, at 2004, a determination can be made whether the 5G utilization or the 5G capture rate satisfies a defined threshold. The defined threshold can be a defined utilization level and/or a defined capture rate level. According to an implementation, the determination of whether the 5G capture rate satisfies the defined threshold is whether the capture rate level is at or above the defined capture rate level. In another implementation, the determination of whether the capture rate satisfies the defined threshold is whether the 5G utilization level is at or above the defined utilization level.

If the determination at 2004 is that the 5G utilization and/or the 5G device capture rate is not above the threshold ("NO"), a historical database (e.g., the at least one memory 1514) can be updated, at 2006, and the computer-implemented method 2000 can return to 2002 with continuing monitoring of the 5G RAN utilization and/or the 5G device capture rate.

Alternatively, if the determination at 2004 is that the 5G utilization and/or the 5G device capture rate is at or above the threshold ("YES"), at 2008, a determination can be made whether a PSD and/or uplink link failure is less than a maximum value. For example, the maximum value can be a PSD maximum value and/or a maximum uplink radio link failure amount. If the determination is that the PSD and/or uplink link failure is not less than the maximum value, or is more than the maximum value ("NO"), the historical database (e.g., the at least one memory 1514) can be updated, at 2006, and the computer-implemented method 2000 can return to 2002 with continuing monitoring of the 5G RAN utilization and/or the 5G device capture rate.

Alternatively, if the determination at 2008 is that the PSD and/or uplink link failure is less than the maximum value ("YES"), the computer-implemented method 2000 continues, at 2010, and a determination can be made whether the 5G devices on LTE only are within 3 dB of 5G capture. It is noted that the value of 3 dB is utilized for example purposes only and other values can be utilized. If there are no 5G devices on LTE only within 3 dB of 5G capture ("NO"), the historical database (e.g., the at least one memory 1514) can be updated, at 2006, and the computer-implemented method 2000 can return to 2002 with continuing monitoring of the 5G RAN utilization and/or the 5G device capture rate.

Alternatively, if the determination at 2010 is that there are 5G devices on LTE only within 3 dB of 5G capture ("YES"), the computer-implemented method 2000 can continue at 2012 and the scenario can be cross-checked against the historical database. Based on the cross-checking, a determination can be made at 2014 whether there is a historical match. For example, the determination can be whether a similar situation (e.g., number of UE devices, location of UE devices, parameters of the UE devices, criteria associated with the UE devices, or combinations thereof) between the actual network being monitored and the data retained in the historical database. If a match is found ("YES"), at 2016 a historical best-fit PSD change can be applied to the network. If a match is not found ("NO"), at 2018 the PSD can be increased 3 dB with a fifty percent (50%) bandwidth reduction.

Upon or after the historical best-fit is applied, at 2016, or the PSD is increased by 3 dB, at 2016, the computer-implemented method 2000 continues at 2020 and a center channel can be retuned for minimal neighbor spectral overlap and neighbor lists can be updated.

Upon or after the neighbor lists are updated, at 2020, the capture, utilization, throughput, and retainability results can be verified, at 2022. A determination can be made, at 2024 whether the results meet the expectations. If the results meet the expectations ("YES"), the historical database can be updated at 2006 and further monitoring can be performed at 2002.

If the determination at 2024 is that the results do not meet expectations ("NO"), at 2026 a determination can be made whether the results are negative. If the results are not negative ("NO"), the computer-implemented method 2000 can update the historical database at 2006 and continue monitoring at 2002. However, if the determination at 2026 is that the results are negative ("YES"), at 2028, a reversion to baseline (last) parameter configuration can be performed. Upon or after the reversion, the computer-implemented method 2000 can update the historical database at 2006 and continue monitoring 2002.

It is noted that 2002 through 2020 relate to opportunity detection, solution definition, and solution implementation, as discussed herein. Further, 2022 through 2028 relate to results verification as discussed herein.

Figure 21:
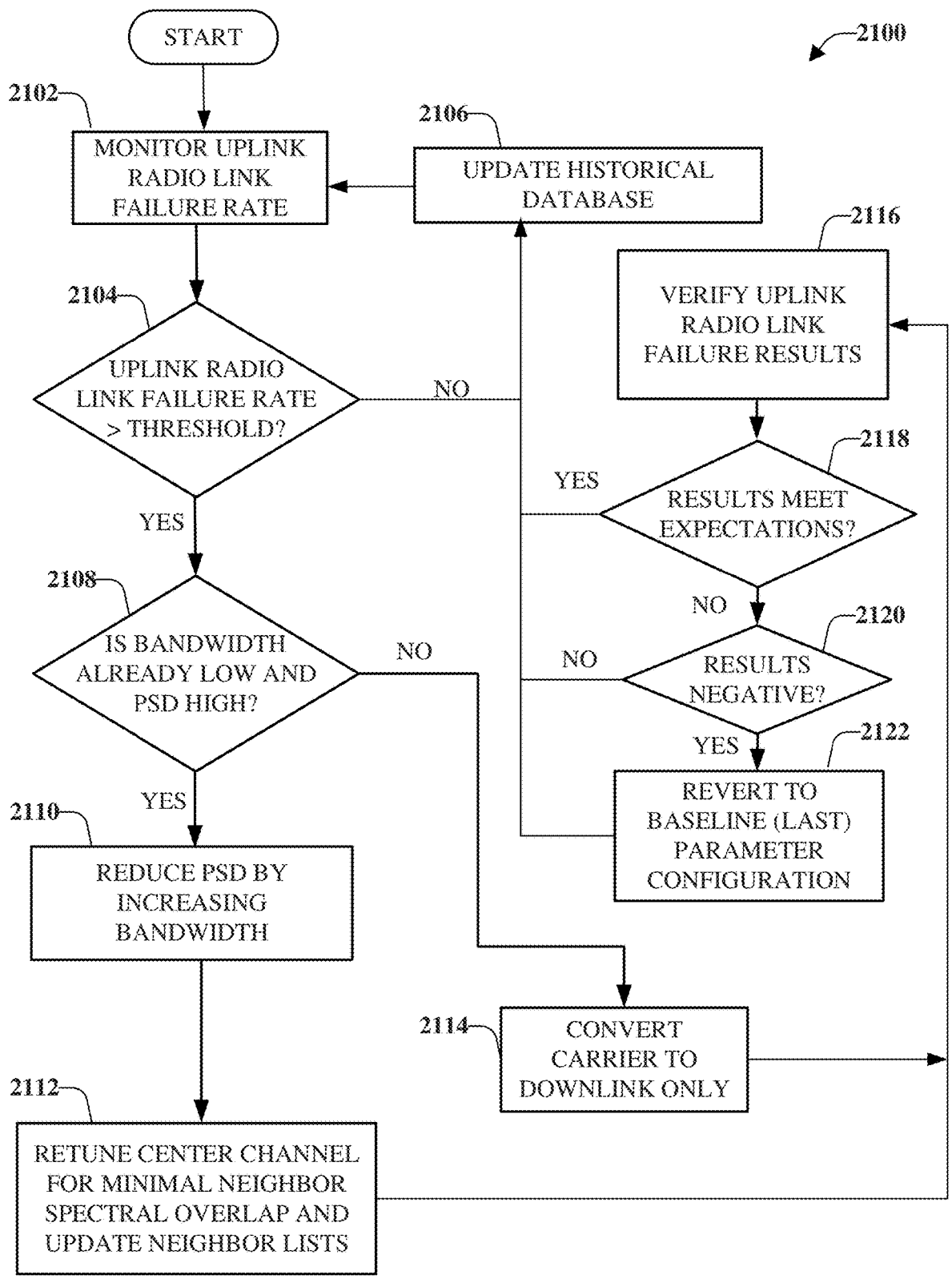
FIG. 21 illustrates a flow diagram of another example, non-limiting, computer-implemented method for facilitating mobility as a service for a stationary device in advanced networks in accordance with one or more embodiments described herein.

FIG. 21 illustrates a flow diagram of another example, non-limiting, computer-implemented method 2100 for facilitating mobility as a service for a stationary device in advanced networks in accordance with one or more embodiments described herein. Repetitive description of like elements employed in other embodiments described herein is omitted for sake of brevity.

In some implementations, a system comprising a processor can perform the computer-implemented method 2100 and/or other methods discussed herein. In other implementations, a device comprising a processor can perform the computer-implemented method 2100 and/or other methods discussed herein. In other implementations, a machine-readable storage medium, can comprise executable instructions that, when executed by a processor, facilitate performance of operations, which can be the operations discussed with respect to the computer-implemented method 2100 and/or other methods discussed herein. In further implementations, a computer readable storage device comprising executable instructions that, in response to execution, cause a system comprising a processor to perform operations, which can be operations discussed with respect to the computer-implemented method 2100 and/or other methods discussed herein.

At 2102, an uplink radio link failure rate can be monitored and, at 2104, a determination can be made whether the uplink radio link failure rate is more than a threshold failure rate value. If the uplink radio link failure rate is not more than the threshold failure rate value ("NO"), the computer-implemented method 2100 continues, at 2106, and a historical database can be updated and further monitoring can be performed at 2102.

Alternatively, if the uplink radio link failure rate is more than the threshold failure rate value ("YES"), at 2108 a determination is made whether the bandwidth is already low and the power spectral density is high. If the bandwidth is low and the PSD is high ("YES"), at 2110 the PSD can be reduced by increasing the bandwidth and, at 2112, center channel for minimal neighbor spectral overlap can be retuned and neighbor lists can be updated. Alternatively, if it is determined that the bandwidth is not at a low threshold and the PSD is not at a high threshold ("NO"), at 2114, the carrier can be converted to downlink only.

Upon or after the neighbor list is updated at 2112 or the carrier is converted at 2114, the computer-implemented method 2100 continues at 2116 when the uplink radio link failure results are verified. Accordingly, a determination can be made at 2118 whether the results meet expectations. If the results do meet expectations ("YES"), the historical database can be updated at 2106 and further monitoring can be performed at 2102.

If the results do not meet expectations ("NO"), at 2120 a determination can be made whether the results are negative. If the results are not negative ("NO"), the historical database can be updated at 2106. However, if the results are negative ("YES"), the computer-implemented method 2100 can revert to baseline (e.g., last or most recent) parameter configuration, at 2122. Thereafter, the historical database can be updated at 2106 and further monitoring can be performed at 2102.

It is noted that 2102 through 2114 relate to opportunity detection, solution definition, and solution implementation, as discussed herein. Further, 2116 through 2122 relate to results verification as discussed herein.

Described herein are systems, methods, articles of manufacture, and other embodiments or implementations that can facilitate adaptive power spectral density with chromatic spectrum optimization in advanced networks. Facilitating adaptive power spectral density can be implemented in connection with any type of device with a connection to the communications network (e.g., a mobile handset, a computer, a handheld device, etc.) any Internet of things (IoT) device (e.g., toaster, coffee maker, blinds, music players, speakers, water meter, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t, N_r)$ system, where $N_t$ denotes the number of transmit antennas and Nr denotes the receive antennas, the peak data rate multiplies with a factor of $N_t$ over single antenna systems in rich scattering environment.

In addition, advanced networks, such as a 5G network can be configured to provide more bandwidth than the bandwidth available in other networks (e.g., 4G network, 5G network). A 5G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 5G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 22:
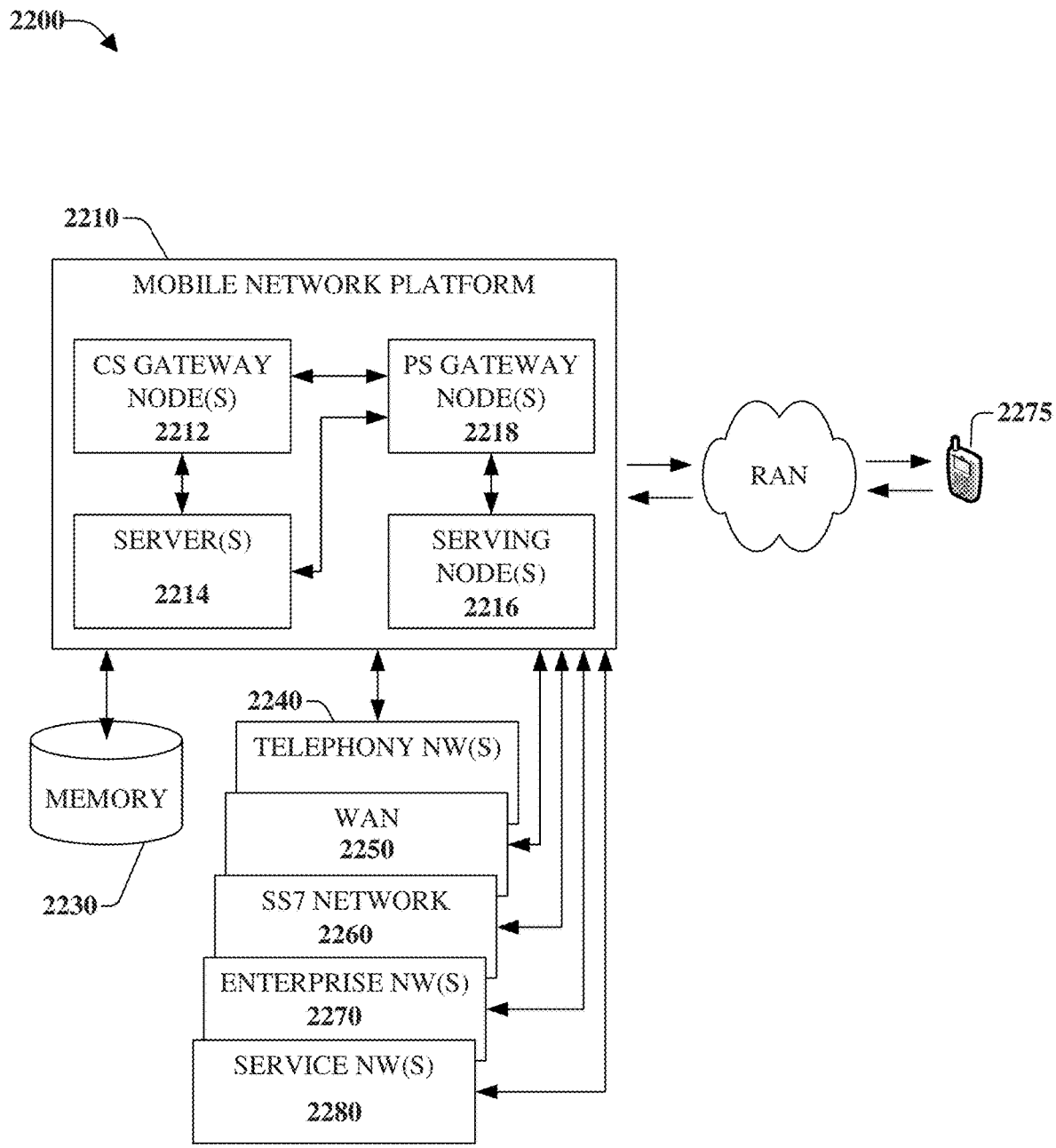
FIG. 22 illustrates an example block diagram of a non-limiting embodiment of a mobile network platform in accordance with various aspects described herein.

FIG. 22 presents an example embodiment 2200 of a mobile network platform 2210 that can implement and exploit one or more aspects of the disclosed subject matter described herein. Generally, wireless network platform 2210 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 2210 can be included in telecommunications carrier networks, and can be considered carrier-side components as discussed elsewhere herein. Mobile network platform 2210 includes CS gateway node(s) 2212 which can interface CS traffic received from legacy networks such as telephony network(s) 2240 (e.g., public switched telephone network (PSTN), or public land mobile network (PLMN)) or a signaling system #7 (SS7) network 2260. Circuit switched gateway node(s) 2212 can authorize and authenticate traffic (e.g., voice) arising from such networks. Additionally, CS gateway node(s) 2212 can access mobility, or roaming, data generated through SS7 network 2260; for instance, mobility data stored in a visited location register (VLR), which can reside in memory 2230. Moreover, CS gateway node(s) 2212 interfaces CS-based traffic and signaling and PS gateway node(s) 2218. As an example, in a 3GPP UMTS network, CS gateway node(s) 2212 can be realized at least in part in gateway GPRS support node(s) (GGSN). It should be appreciated that functionality and specific operation of CS gateway node(s) 2212, PS gateway node(s) 2218, and serving node(s) 2216, is provided and dictated by radio technology(ies) utilized by mobile network platform 2210 for telecommunication. Mobile network platform 2210 can also include the MMEs, HSS/PCRFs, SGWs, and PGWs disclosed herein.

In addition to receiving and processing CS-switched traffic and signaling, PS gateway node(s) 2218 can authorize and authenticate PS-based data sessions with served mobile devices. Data sessions can include traffic, or content(s), exchanged with networks external to the wireless network platform 2210, like wide area network(s) (WANs) 2250, enterprise network(s) 2270, and service network(s) 2280, which can be embodied in local area network(s) (LANs), can also be interfaced with mobile network platform 2210 through PS gateway node(s) 2218. It is to be noted that WANs 2250 and enterprise network(s) 2270 can embody, at least in part, a service network(s) such as IP multimedia subsystem (IMS). Based on radio technology layer(s) available in technology resource(s) 2217, packet-switched gateway node(s) 2218 can generate packet data protocol contexts when a data session is established; other data structures that facilitate routing of packetized data also can be generated. To that end, in an aspect, PS gateway node(s) 2218 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 2200, wireless network platform 2210 also includes serving node(s) 2216 that, based upon available radio technology layer(s) within technology resource(s) 2217, convey the various packetized flows of data streams received through PS gateway node(s) 2218. It is to be noted that for technology resource(s) 2217 that rely primarily on CS communication, server node(s) can deliver traffic without reliance on PS gateway node(s) 2218; for example, server node(s) can embody at least in part a mobile switching center. As an example, in a 3GPP UMTS network, serving node(s) 2216 can be embodied in serving GPRS support node(s) (SGSN).

For radio technologies that exploit packetized communication, server(s) 2214 in wireless network platform 2210 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 2210. Data streams (e.g., content(s) that are part of a voice call or data session) can be conveyed to PS gateway node(s) 2218 for authorization/authentication and initiation of a data session, and to serving node(s) 2216 for communication thereafter. In addition to application server, server(s) 2214 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 2210 to ensure network's operation and data integrity in addition to authorization and authentication procedures that CS gateway node(s) 2212 and PS gateway node(s) 2218 can enact. Moreover, provisioning server(s) can provision services from external network(s) like networks operated by a disparate service provider; for instance, WAN 2250 or Global Positioning System (GPS) network(s) (not shown). Provisioning server(s) can also provision coverage through networks associated to wireless network platform 2210 (e.g., deployed and operated by the same service provider), such as femto-cell network(s) (not shown) that enhance wireless service coverage within indoor confined spaces and offload RAN resources in order to enhance subscriber service experience within a home or business environment by way of UE 2275.

It is to be noted that server(s) 2214 can include one or more processors configured to confer at least in part the functionality of macro network platform 2210. To that end, the one or more processor can execute code instructions stored in memory 2230, for example. It should be appreciated that server(s) 2214 can include a content manager 2215, which operates in substantially the same manner as described hereinbefore.

In example embodiment 2200, memory 2230 can store information related to operation of wireless network platform 2210. Other operational information can include provisioning information of mobile devices served through wireless network platform network 2210, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 2230 can also store information from at least one of telephony network(s) 2240, WAN 2250, enterprise network(s) 2270, or SS7 network 2260. In an aspect, memory 2230 can be, for example, accessed as part of a data store component or as a remotely connected memory store.

Figure 23:
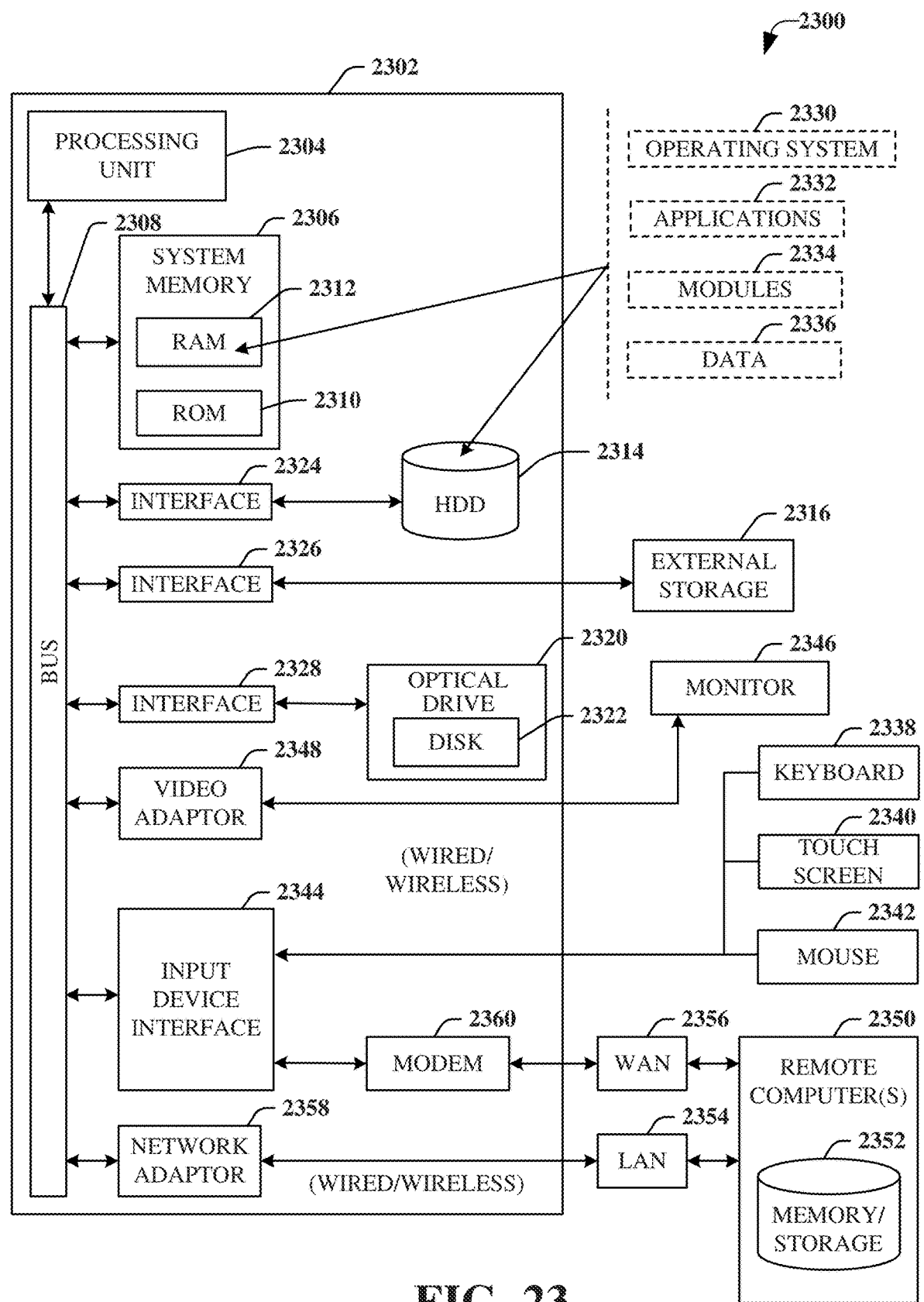
FIG. 23 illustrates an example block diagram of an example computer operable to engage in a system architecture that facilitates wireless communications according to one or more embodiments described herein.

In order to provide additional context for various embodiments described herein, FIG. 23 and the following discussion are intended to provide a brief, general description of a suitable computing environment 2300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 23, the example environment 2300 for implementing various embodiments of the aspects described herein includes a computer 2302, the computer 2302 including a processing unit 2304, a system memory 2306 and a system bus 2308. The system bus 2308 couples system components including, but not limited to, the system memory 2306 to the processing unit 2304. The processing unit 2304 can be any of various commercially available processors. Dual microprocessors and other multi-processor architectures can also be employed as the processing unit 2304.

The system bus 2308 can be any of several types of bus structure that can further interconnect to a memory bus (with or without a memory controller), a peripheral bus, and a local bus using any of a variety of commercially available bus architectures. The system memory 2306 includes ROM 2310 and RAM 2312. A basic input/output system (BIOS) can be stored in a non-volatile memory such as ROM, erasable programmable read only memory (EPROM), EEPROM, which BIOS contains the basic routines that help to transfer information between elements within the computer 2302, such as during startup. The RAM 2312 can also include a high-speed RAM such as static RAM for caching data.

The computer 2302 further includes an internal hard disk drive (HDD) 2314 (e.g., EIDE, SATA), one or more external storage devices 2316 (e.g., a magnetic floppy disk drive (FDD) 2316, a memory stick or flash drive reader, a memory card reader, etc.) and an optical disk drive 2320 (e.g., which can read or write from a CD-ROM disc, a DVD, a BD, etc.). While the internal HDD 2314 is illustrated as located within the computer 2302, the internal HDD 2314 can also be configured for external use in a suitable chassis (not shown). Additionally, while not shown in environment 2300, a solid state drive (SSD) could be used in addition to, or in place of, an HDD 2314. The HDD 2314, external storage device(s) 2316 and optical disk drive 2320 can be connected to the system bus 2308 by an HDD interface 2324, an external storage interface 2326 and an optical drive interface 2328, respectively. The interface 2324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2312, including an operating system 2330, one or more application programs 2332, other program modules 2334 and program data 2336. All or portions of the operating system, applications, modules, and/or data can also be cached in the RAM 2312. The systems and methods described herein can be implemented utilizing various commercially available operating systems or combinations of operating systems.

Computer 2302 can optionally comprise emulation technologies. For example, a hypervisor (not shown) or other intermediary can emulate a hardware environment for operating system 2330, and the emulated hardware can optionally be different from the hardware illustrated in FIG. 23. In such an embodiment, operating system 2330 can comprise one virtual machine (VM) of multiple VMs hosted at computer 2302. Furthermore, operating system 2330 can provide runtime environments, such as the Java runtime environment or the .NET framework, for applications 2332. Runtime environments are consistent execution environments that allow applications 2332 to run on any operating system that includes the runtime environment. Similarly, operating system 2330 can support containers, and applications 2332 can be in the form of containers, which are lightweight, standalone, executable packages of software that include, e.g., code, runtime, system tools, system libraries and settings for an application.

Further, computer 2302 can be enable with a security module, such as a trusted processing module (TPM). For instance with a TPM, boot components hash next in time boot components, and wait for a match of results to secured values, before loading a next boot component. This process can take place at any layer in the code execution stack of computer 2302, e.g., applied at the application execution level or at the operating system (OS) kernel level, thereby enabling security at any level of code execution.

A user can enter commands and information into the computer 2302 through one or more wired/wireless input devices, e.g., a keyboard 2338, a touch screen 2340, and a pointing device, such as a mouse 2342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2304 through an input device interface 2344 that can be coupled to the system bus 2308, but can be connected by other interfaces, such as a parallel port, an IEEE 1394 serial port, a game port, a USB port, an IR interface, a BLUETOOTH® interface, etc.

A monitor 2346 or other type of display device can be also connected to the system bus 2308 via an interface, such as a video adapter 2348. In addition to the monitor 2346, a computer typically includes other peripheral output devices (not shown), such as speakers, printers, etc.

The computer 2302 can operate in a networked environment using logical connections via wired and/or wireless communications to one or more remote computers, such as a remote computer(s) 2350. The remote computer(s) 2350 can be a workstation, a server computer, a router, a personal computer, portable computer, microprocessor-based entertainment appliance, a peer device or other common network node, and typically includes many or all of the elements described relative to the computer 2302, although, for purposes of brevity, only a memory/storage device 2352 is illustrated. The logical connections depicted include wired/wireless connectivity to a local area network (LAN) 2354 and/or larger networks, e.g., a wide area network (WAN)

2356. Such LAN and WAN networking environments are commonplace in offices and companies, and facilitate enterprise-wide computer networks, such as intranets, all of which can connect to a global communications network, e.g., the Internet.

When used in a LAN networking environment, the computer 2302 can be connected to the local network 2354 through a wired and/or wireless communication network interface or adapter 2358. The adapter 2358 can facilitate wired or wireless communication to the LAN 2354, which can also include a wireless access point (AP) disposed thereon for communicating with the adapter 2358 in a wireless mode.

When used in a WAN networking environment, the computer 2302 can include a modem 2360 or can be connected to a communications server on the WAN 2356 via other means for establishing communications over the WAN 2356, such as by way of the Internet. The modem 2360, which can be internal or external and a wired or wireless device, can be connected to the system bus 2308 via the input device interface 2344. In a networked environment, program modules depicted relative to the computer 2302 or portions thereof, can be stored in the remote memory/storage device 2352. It will be appreciated that the network connections shown are example and other means of establishing a communications link between the computers can be used.

When used in either a LAN or WAN networking environment, the computer 2302 can access cloud storage systems or other network-based storage systems in addition to, or in place of, external storage devices 2316 as described above. Generally, a connection between the computer 2302 and a cloud storage system can be established over a LAN 2354 or WAN 2356 e.g., by the adapter 2358 or modem 2360, respectively. Upon connecting the computer 2302 to an associated cloud storage system, the external storage interface 2326 can, with the aid of the adapter 2358 and/or modem 2360, manage storage provided by the cloud storage system as it would other types of external storage. For instance, the external storage interface 2326 can be configured to provide access to cloud storage sources as if those sources were physically connected to the computer 2302.

The computer 2302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
   determining that a first utilization level of network equipment that is part of a radio access network is below a defined utilization threshold, wherein the first utilization level is a first number of user equipment using a millimeter wave spectrum of the radio access network; and
   performing an adjustment of a power spectral density of the network equipment by a defined amount based on a second utilization level determined for the network equipment, wherein the second utilization level comprises a second number of user equipment using the millimeter wave spectrum via the radio access network, and wherein the second number of user equipment is greater than the first number of user equipment;
   determining a realized utilization level that comprises an actual number of user equipment using the millimeter wave spectrum via the radio access network after the performing of the adjustment of the power spectral density; and
   reversing the adjustment of the power spectral density based on a determination that the realized utilization level is less than the first utilization level.

2. The system of claim 1, wherein the adjustment is a first adjustment, wherein the determination is a first determination, and wherein the operations further comprise:
   comparing the realized utilization level with the second utilization level; and
   performing a second adjustment to the power spectral density by a second defined value based on a second determination that the realized utilization level is less than the second utilization level and is greater than the first utilization level.

3. The system of claim 2, wherein the performing the second adjustment to the power spectral density comprises:
   waiting a defined time interval prior to the performing the second adjustment; and
   performing an incremental change to the power spectral density.

4. The system of claim 1, wherein the operations further comprise:
   prior to the performing the adjustment of the power spectral density, comparing a quantity of user equipment not using the millimeter wave spectrum with the first utilization level; and
   providing, to a group of user equipment of the quantity of user equipment not using the millimeter wave spectrum, an opportunity to use the millimeter wave spectrum based on the adjustment of the power spectral density of the network equipment.

5. The system of claim 1, wherein the operations further comprise:
   evaluating a result of the adjustment of the power spectral density of the network equipment; and
   retaining the result as historical data for an adjustment decision in a subsequent process cycle.

6. The system of claim 1, wherein the system is deployed in a non-standalone deployment architecture.

7. The system of claim 1, wherein the system is deployed in a standalone deployment architecture.

8. The system of claim 1, wherein the network equipment is configured to operate according to a fifth generation communication protocol.

9. A method, comprising:
   evaluating, by a system comprising a processor, a first capture rate of user equipment within a radio access network, wherein the first capture rate is representative of a first quantity of user equipment using a millimeter wave spectrum enabled for consumption via the radio access network;
   facilitating, by the system, an adjustment to a power spectral density of the radio access network based on a first determination that the first capture rate fails to satisfy a target capture rate of user equipment using the millimeter wave spectrum;
   evaluating, by the system, a second capture rate of user equipment within the radio access network, wherein the second capture rate is representative of a second quantity of user equipment using the millimeter wave spectrum after the facilitating of the adjustment to the power spectral density of the radio access network; and
   reverting, by the system, the adjustment to the power spectral density to an original power spectral density based on a second determination that the second capture rate is less than the first capture rate.

10. The method of claim 9, wherein the facilitating of the adjustment comprises facilitating the adjustment by a first amount determined based on a difference between the first capture rate of the user equipment and the target capture rate.

11. The method of claim 9, wherein the adjustment is a first adjustment, and wherein the method further comprises:
   facilitating, by the system, a second adjustment to the power spectral density based on a second third determination that the second capture rate is larger than the first capture rate and fails to satisfy the target capture rate.

12. The method of claim 10, further comprising:
   evaluating, by the system, a result of the facilitating of the adjustment to the power spectral density; and
   storing, by the system, the result in a data store as historical reference information, wherein the historical reference information is utilized in a subsequent adjustment to the power spectral density that is subsequent to the adjustment.

13. A system, comprising:
    a processor; and
    a memory that stores executable instructions that, when executed by the processor, facilitate performance of operations, comprising:
    determining that a first utilization level of network equipment is below a defined utilization threshold, wherein the first utilization level is a first number of user equipment using a millimeter wave spectrum via a radio access network; and comparing a quantity of user equipment not using the millimeter wave spectrum with the first utilization level;

performing an adjustment of a power spectral density of the network equipment by a defined amount based on a second utilization level determined for the network equipment, wherein the second utilization level comprises a second number of user equipment using the millimeter wave spectrum via the radio access network, and wherein the second number of user equipment is greater than the first number of user equipment; and providing, to a group of user equipment of the quantity of user equipment not using the millimeter wave spectrum, an opportunity to use the millimeter wave spectrum based on the adjustment of the power spectral density of the network equipment.

14. The system of claim 13, wherein the operations further comprise:

determining a realized utilization level after the performing of the adjustment, wherein the realized utilization level comprises an actual number of user equipment using the millimeter wave spectrum via the radio access network after the performing of the adjustment.

15. The system of claim 14, wherein the adjustment is a first adjustment, and wherein the operations further comprise:

comparing the realized utilization level with the second utilization level; and performing a second adjustment to the power spectral density by a second defined value based on a determination that the realized utilization level is less than the second utilization level and is greater than the first utilization level.

16. The system of claim 15, wherein the performing of the second adjustment to the power spectral density comprises:

waiting a defined time interval prior to the performing of the second adjustment; and performing an incremental change to the power spectral density.

17. The system of claim 14, wherein the operations further comprise:

reversing the adjustment of the power spectral density based on a determination that the realized utilization level is less than the first utilization level.

18. The system of claim 13, wherein the operations further comprise:

evaluating a result of the adjustment of the power spectral density of the network equipment; and retaining the result as historical data for an adjustment decision in a subsequent process cycle.

19. The system of claim 13, wherein the system is deployed in a non-standalone deployment architecture.

20. The system of claim 13, wherein the system is deployed in a standalone deployment architecture.

* * * * *